US012130576B2

(12) United States Patent
Sato et al.

(10) Patent No.: US 12,130,576 B2
(45) Date of Patent: Oct. 29, 2024

(54) IMAGE FORMING APPARATUS AND TONER CARTRIDGE

(71) Applicant: BROTHER KOGYO KABUSHIKI KAISHA, Nagoya (JP)

(72) Inventors: Shougo Sato, Seto (JP); Yasuo Fukamachi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/344,272

(22) Filed: Jun. 29, 2023

(65) Prior Publication Data

US 2024/0069483 A1 Feb. 29, 2024

Related U.S. Application Data

(63) Continuation of application No. 17/472,763, filed on Sep. 13, 2021, now Pat. No. 11,733,639, which is a (Continued)

(30) Foreign Application Priority Data

May 24, 2018 (JP) ................................ 2018-099444

(51) Int. Cl.
*G03G 21/12* (2006.01)
*G03G 15/08* (2006.01)
*G03G 21/10* (2006.01)

(52) U.S. Cl.
CPC ....... *G03G 21/105* (2013.01); *G03G 15/0886* (2013.01); *G03G 21/12* (2013.01)

(58) Field of Classification Search
CPC ........... G03G 15/0881; G03G 15/0886; G03G 21/10; G03G 21/105; G03G 21/12; G03G 2221/1621
See application file for complete search history.

(56) References Cited

U.S. PATENT DOCUMENTS 8,369,745 B2 * 2/2013 Sato ....................... G03G 21/12 399/358
8,934,828 B2 1/2015 Sato
(Continued)

FOREIGN PATENT DOCUMENTS

JP 2011-013368 A 1/2011
JP 2012-73438 A 4/2012
(Continued)

OTHER PUBLICATIONS

Japanese Office Action for the related Japanese Patent Application No. 2018-09944 dated Mar. 29, 2022.

*Primary Examiner* — Erika J. Villaluna
(74) *Attorney, Agent, or Firm* — KENEALY VAIDYA LLP

(57) ABSTRACT

An image forming apparatus includes an apparatus main body, a drawer, a drum cartridge, an exposure device, a fixing device, and a toner cartridge. The drum cartridge includes a photosensitive drum, a cleaning member, a developing device, a waste toner conveying pipe, and a frame. The toner cartridge includes a toner container and a waste toner container. The cleaning member is located between the photosensitive drum and the fixing device in a vertical direction in the state where the drum cartridge is mounted to the drawer and the drawer is located at an inner position. The drum cartridge is capable of being mounted to the drawer. The toner cartridge is attachable to and detachable from the drum cartridge.

11 Claims, 15 Drawing Sheets

Related U.S. Application Data continuation of application No. 16/421,445, filed on May 23, 2019, now Pat. No. 11,119,438.

(56) References Cited

U.S. PATENT DOCUMENTS

| | | | |
|---|---|---|---|
| 2010/0329746 | A1 | 12/2010 | Sato |
| 2012/0076534 | A1 | 3/2012 | Sato |
| 2014/0186071 | A1 | 7/2014 | Sato |
| 2015/0261173 | A1 | 9/2015 | Sato |
| 2015/0355595 | A1 | 12/2015 | Jang et al. |
| 2016/0103418 | A1 | 4/2016 | Yada et al. |
| 2016/0139558 | A1 | 5/2016 | Kawakami et al. |
| 2016/0154373 | A1 | 6/2016 | Numata et al. |
| 2016/0154374 | A1 | 6/2016 | Hiramatsu et al. |
| 2017/0102641 | A1 | 4/2017 | Sato |
| 2017/0219965 | A1 | 8/2017 | Sakaya et al. |
| 2017/0355192 | A1 | 12/2017 | Makiguchi et al. |

FOREIGN PATENT DOCUMENTS

| | | | |
|---|---|---|---|
| JP | 2014-126839 | A | 7/2014 |
| JP | 2015-175936 | A | 10/2015 |
| JP | 2016-81034 | A | 5/2016 |
| JP | 2016-99403 | A | 5/2016 |
| JP | 2016-102986 | A | 6/2016 |
| JP | 2016-110104 | A | 6/2016 |
| JP | 2016-110133 | A | 6/2016 |
| JP | 2017-72704 | A | 4/2017 |
| JP | 2017-161614 | A | 9/2017 |
| JP | 2017-223805 | A | 12/2017 |

* cited by examiner

IMAGE FORMING APPARATUS AND TONER CARTRIDGE

CROSS-REFERENCE TO RELATED APPLICATIONS

This application is a continuation of and claims priority under 35 U.S.C. § 120 to U.S. patent application Ser. No. 17/472,763 filed Sep. 13, 2021, which claims priority to U.S. patent application Ser. No. 16/421,445 filed May 23, 2019 which issued as U.S. Pat. No. 11,119,438 on Sep. 14, 2021, the entire disclosures of which are hereby incorporated by reference, which in turn is based upon and claims the benefit of priority under 35 U.S.C. § 119 to prior Japanese patent application No. 2018-099444, filed on May 24, 2018, the entire contents of which are incorporated herein by reference.

TECHNICAL FIELD

The present disclosure relates to an image forming apparatus and a toner cartridge.

BACKGROUND

In the related art, an image forming apparatus includes an apparatus main body, a drawer movable between an inner position located inside the apparatus main body and an outer position located outside the apparatus main body, a cartridge capable of being mounted to the drawer, an exposure device, and a fixing device. The cartridge includes a photosensitive drum, a cleaning member configured to remove waste toner from the photosensitive drum, and a developing unit including a developing roller and configured to accommodate therein toner. In a state where the cartridge is mounted to the drawer and the drawer is located at the inner position, the cleaning member is located between the photosensitive drum and the fixing device.

In the image forming apparatus described in related art, the cartridge integrally includes the photosensitive drum and the developing unit.

For this reason, for example, when a remaining amount of toner in the developing unit is reduced, the entire cartridge including the photosensitive drum needs to be replaced even when it is not necessary to replace the photosensitive drum. As a result, it is difficult to save cost.

SUMMARY

Aspect of non-limiting embodiments of the present disclosure relates to provide an image forming apparatus in which a cleaning member is located between a photosensitive drum and a fixing device in a state where a drum cartridge is mounted to a drawer and the drawer is located at an inner position and a drum cartridge and a toner cartridge can be individually replaced.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an image forming apparatus including: an apparatus main body; a drawer moveable between an inner position located inside the apparatus main body and an outer position located outside the apparatus main body; a drum cartridge including: a photosensitive drum; a cleaning member configured to remove waste toner from the photosensitive drum; a developing device including a developing roller configured to form a toner image by developing a latent image formed on the photosensitive drum by toner and being movable relative to the photosensitive drum; a waste toner conveying pipe configured to convey the waste toner removed from the photosensitive drum by the cleaning member; and a frame supporting the photosensitive drum, the cleaning member and the developing device; an exposure device configured to expose the photosensitive drum to form a latent image on a peripheral surface of the photosensitive drum; a fixing device configured to fix the toner image transferred from the photosensitive drum to a printing medium and being spaced upward from the photosensitive drum in a state where the drum cartridge is mounted to the drawer and the drawer is located at the inner position; and a toner cartridge including: a toner container capable of accommodating therein the toner to be supplied to the developing roller; and a waste toner container capable of accommodating therein the waste toner, wherein the cleaning member is located between the photosensitive drum and the fixing device in a vertical direction in the state where the drum cartridge is mounted to the drawer and the drawer is located at the inner position, wherein the drum cartridge is capable of being mounted to the drawer, and wherein the toner cartridge is attachable to and detachable from the drum cartridge.

According to another aspect of the present disclosure, there is provided a toner cartridge including: a toner container capable of accommodating therein toner and having a toner discharge port through which the toner is to be discharged, the toner container including: a shutter configured to be movable between a closing position at which the shutter closes the toner discharge port and an opening position at which the shutter opens the toner discharge port; and a lever configured to move the shutter and movable between a first position at which the shutter is located at the closing position and a second position at which the shutter is located at the opening position; and a waste toner container capable of accommodating therein waste toner and moveably coupled to the toner container, wherein when the lever is located at the first position, the lever is engaged with the waste toner container, so that the waste toner container is immovable relative to the toner container, and wherein when the lever is located at the second position, engagement between the lever and the waste toner container is released, so that the waste toner container is movable relative to the toner container.

DETAILED DESCRIPTION

1. Outline of Image Forming Apparatus of First Exemplary Embodiment

Figure 1:
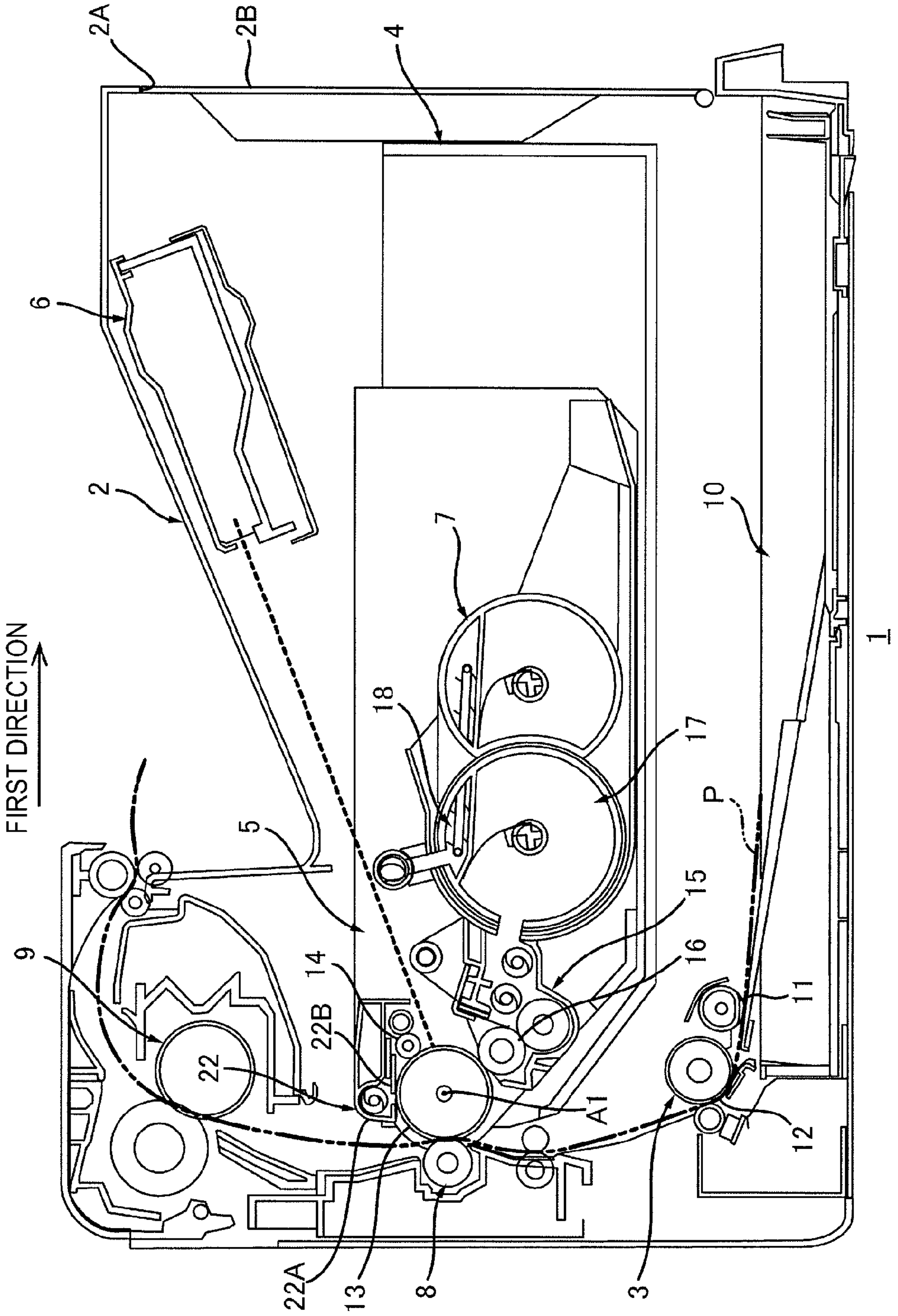
FIG. 1 is a schematic configuration view of an image forming apparatus.
Figure 2:
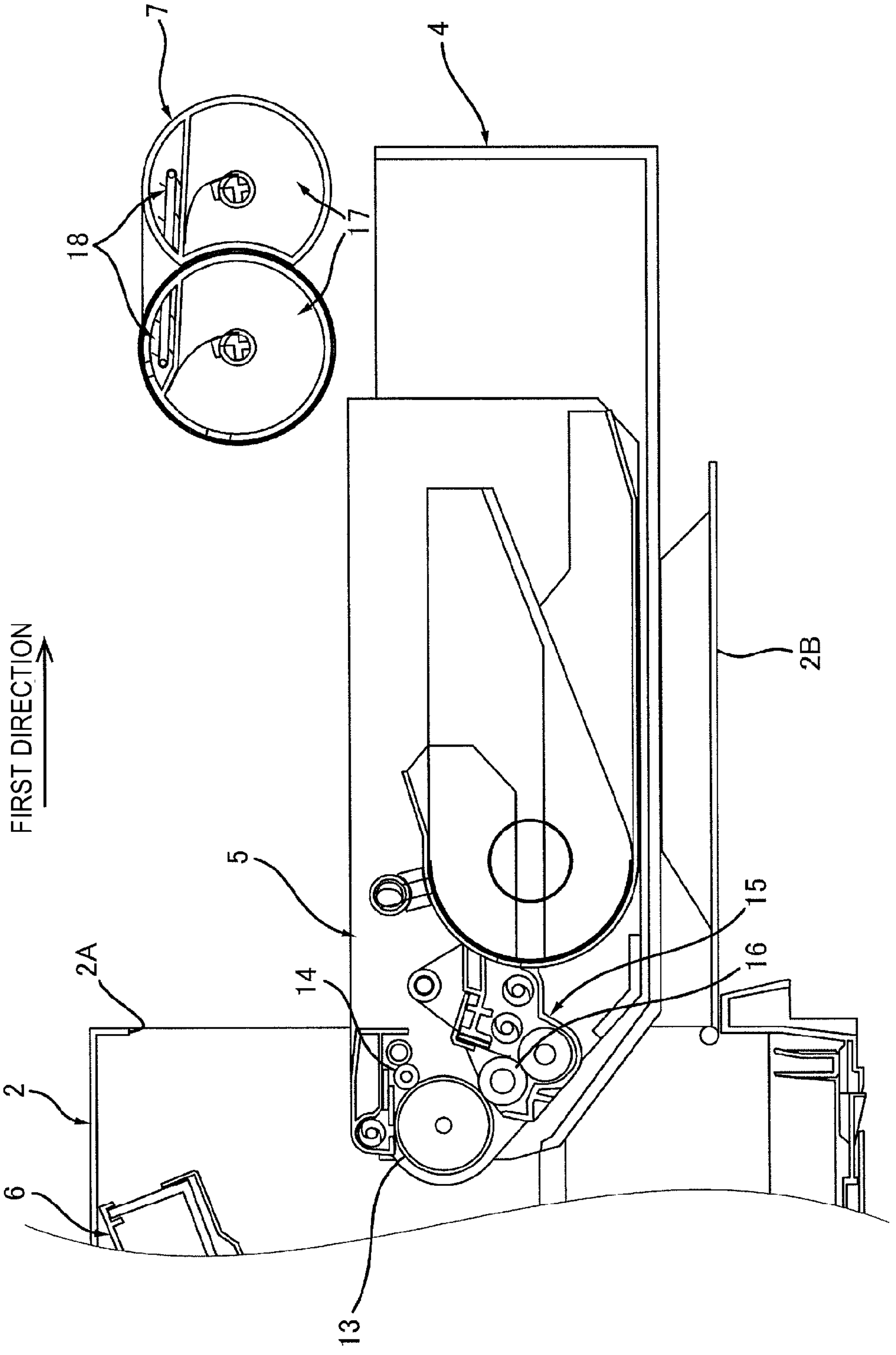
FIG. 2 depicts a state where a drawer shown in FIG. 1 is located at an outer position.

Referring to FIGS. 1 and 2, an outline of an image forming apparatus 1 of a first exemplary embodiment is described.

As shown in FIG. 1, the image forming apparatus 1 includes an apparatus main body 2, a feeder unit 3, a drawer 4, a drum cartridge 5, an exposure device 6, a toner cartridge 7, a transfer roller 8, and a fixing device 9.

1.1 Apparatus Main Body

The apparatus main body 2 is configured to accommodate therein the feeder unit 3, the drawer 4, the drum cartridge 5, the exposure device 6, the toner cartridge 7, the transfer roller 8, and the fixing device 9. The apparatus main body 2 has an opening 2A and a cover 2B.

The opening 2A is located at an opposite side to the transfer roller 8 with respect to the drum cartridge 5 in a state where the drum cartridge 5 is mounted to the apparatus main body 2.

The cover 2B is configured to be movable between a closing position (see FIG. 1) at which the opening 2A is closed and an opening position (see FIG. 2) at which the opening 2A is opened.

1.2 Feeder Unit

The feeder unit 3 is configured to feed a printing medium P to a photosensitive drum 13. The printing medium P is, for example, a printing sheet. The photosensitive drum 13 will be described later. The feeder unit 3 includes a sheet feeding tray 10, a pickup roller 11, and a sheet feeding roller 12. The sheet feeding tray 10 is configured to accommodate therein the printing medium P. The pickup roller 11 is configured to convey the printing medium P in the sheet feeding tray 10 toward the sheet feeding roller 12. The sheet feeding roller 12 is configured to covey the printing medium P sent from the pickup roller 11 toward the photosensitive drum 13.

1.3 Drawer

The drawer 4 is configured to be movable between an inner position (see FIG. 1) and an outer position (see FIG. 2) in a state where the cover 2B is located at the opening position. When the drawer 4 is located at the inner position, the drawer 4 is located inside the apparatus main body 2. When the drawer 4 is located at the outer position, the drawer 4 is located outside the apparatus main body 2. The drawer 4 is configured to support the drum cartridge 5. The drawer 4 is configured to be movable while supporting the drum cartridge 5 between the inner position and the outer position.

1.4 Drum Cartridge

The drum cartridge 5 is mountable to the drawer 4. The drum cartridge 5 includes a photosensitive drum 13, a charging roller 14, and a developing device 15.

The photosensitive drum 13 is configured to be rotatable about a rotary axis A1. A direction in which the rotary axis A1 of the photosensitive drum 13 extends is defined as an axis direction. The photosensitive drum 13 extends in the axis direction, and has a cylindrical shape.

The charging roller 14 is configured to charge a peripheral surface of the photosensitive drum 13. The charging roller 14 is in contact with the peripheral surface of the photosensitive drum 13. In the meantime, the drum cartridge 5 may include a non-contact type charger such as a scorotron-type charger, instead of the charging roller 14.

The developing device 15 is configured to be movable relative to the photosensitive drum 13. The developing device 15 includes a developing roller 16.

The developing roller 16 is in contact with the photosensitive drum 13. The developing roller 16 can supply the toner in the developing device 15 to the photosensitive drum 13. Thereby, the developing roller 16 is configured to develop a latent image formed on the photosensitive drum 13 by the toner, thereby forming a toner image on the peripheral surface of the photosensitive drum 13.

1.5 Exposure Device

The exposure device 6 is configured to form a latent image by exposing the photosensitive drum 13. Specifically, the exposure device 6 is configured to expose the peripheral surface of the photosensitive drum 13 charged by the charging roller 14. Thereby, a latent image is formed on the peripheral surface of the photosensitive drum 13. The exposure device 6 is located above the drawer 4. Specifically, the exposure device 6 is a laser scan unit.

1.6 Toner Cartridge

The toner cartridge 7 is attachable to and detachable from the drum cartridge 5. The toner cartridge 7 includes a toner container 17 and a waste toner container 18. The toner container 17 can accommodate therein toner that is to be supplied to the developing roller 16. The waste toner container 18 can accommodate therein waste toner. The waste toner indicates toner removed from the peripheral surface of the photosensitive drum 13 by a cleaning member 22B. The cleaning member 22B will be described later.

1.7 Transfer Roller

The transfer roller 8 is in contact with the photosensitive drum 13 in a state where the drum cartridge 5 is mounted to the drawer 4 and the drawer 4 is located at the inner position. The printing medium P fed from the sheet feeding tray 10 passes between the transfer roller 8 and the photosensitive drum 13. At this time, the transfer roller 8 is configured to transfer the toner image formed on the peripheral surface of the photosensitive drum 13 to the printing medium P.

1.8 Fixing Device

The fixing device 9 is configured to heat and press the printing medium P having the toner image transferred thereto, thereby fixing the toner image, which has been transferred from the photosensitive drum 13 to the printing medium P, on the printing medium P. The printing medium P having passed through the fixing device 9 is discharged onto an upper surface of the apparatus main body 2. The fixing device 9 is spaced upward from the photosensitive drum 13 in the state where the drum cartridge 5 is mounted to the drawer 4 and the drawer 4 is located at the inner position. That is, the image forming apparatus 1 is equipped on a horizontal stand or the like so that the fixing device 9 is located above the photosensitive drum 13.

2. Details of Drum Cartridge

Subsequently, the drum cartridge 5 is described in detail with reference to FIGS. 3 and 4.

The drum cartridge 5 includes a frame 21, a drum cleaner 22, a waste toner conveying pipe 23, a first screw 24, a second screw 25, a shaft 26, and a seal member 27 (see FIG. 4), in addition to the photosensitive drum 13, the charging roller 14 and the developing device 15.

2.1 Frame

The frame 21 is configured to support the photosensitive drum 13, the charging roller 14, the developing device 15, the drum cleaner 22, the waste toner conveying pipe 23 and the first screw 24. The frame 21 has a first side plate 21A and a second side plate 21B.

Figure 3:
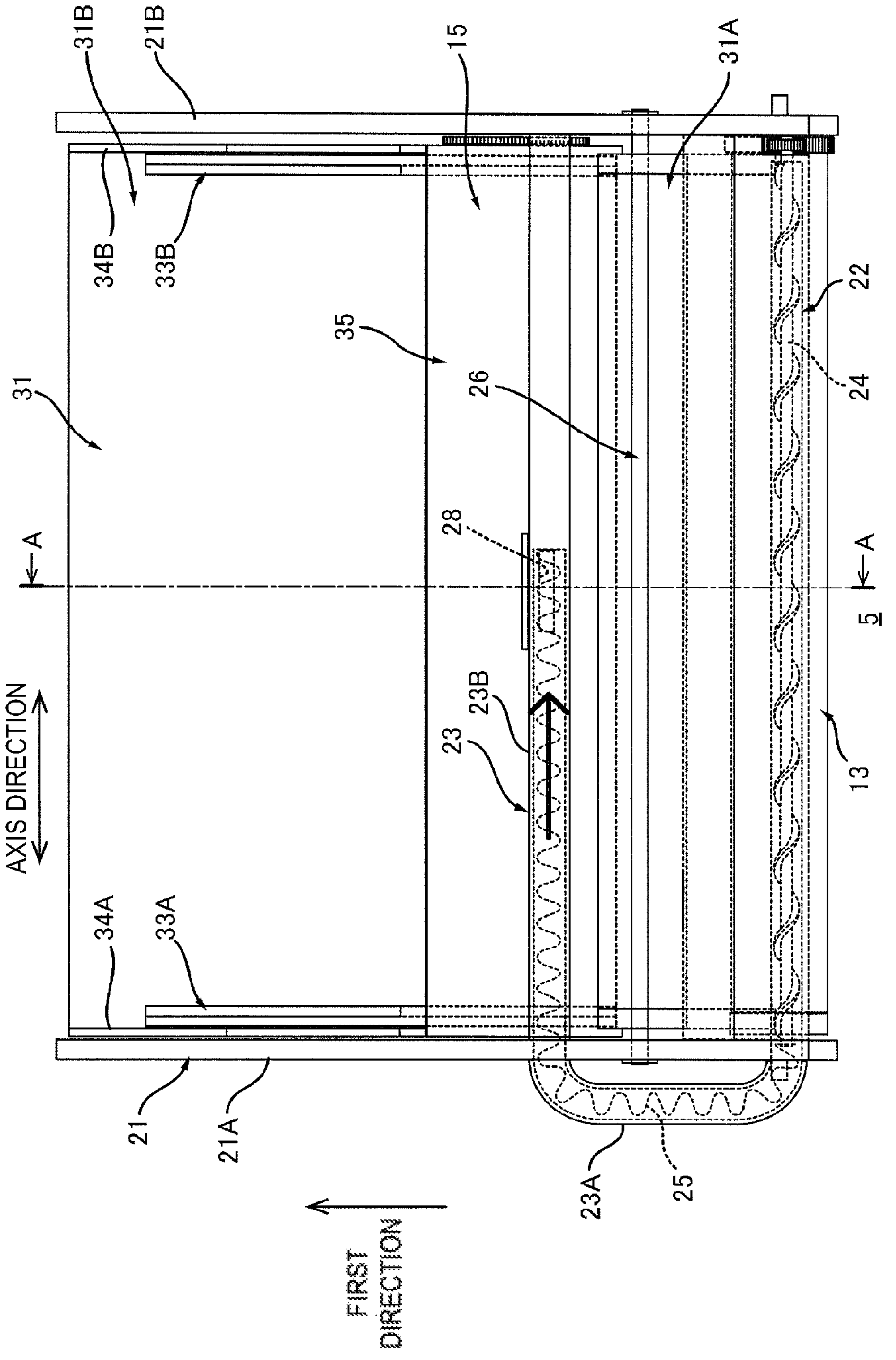
FIG. 3 is a plan view of a drum cartridge shown in FIG. 1.

As shown in FIG. 3, the first side plate 21A is located at one end of the frame 21 in the axis direction. The first side plate 21A extends in a first direction. The first direction intersects with the axis direction. Preferably, the first direction is perpendicular to the axis direction. The first direction is a direction facing toward a second part 23B of the waste toner conveying pipe 23 from the photosensitive drum 13. The first direction is the same direction as the direction in which the drawer 4 is moved from the inner position toward the outer position, in the state where the drum cartridge 5 is mounted to the drawer 4.

The second side plate 21B is located at the other end of the frame 21 in the axis direction. The second side plate 21B extends in the first direction. The second side plate 21B is located while being spaced from the first side plate 21A in the axis direction.

2.2 Drum Cleaner

Figure 4:
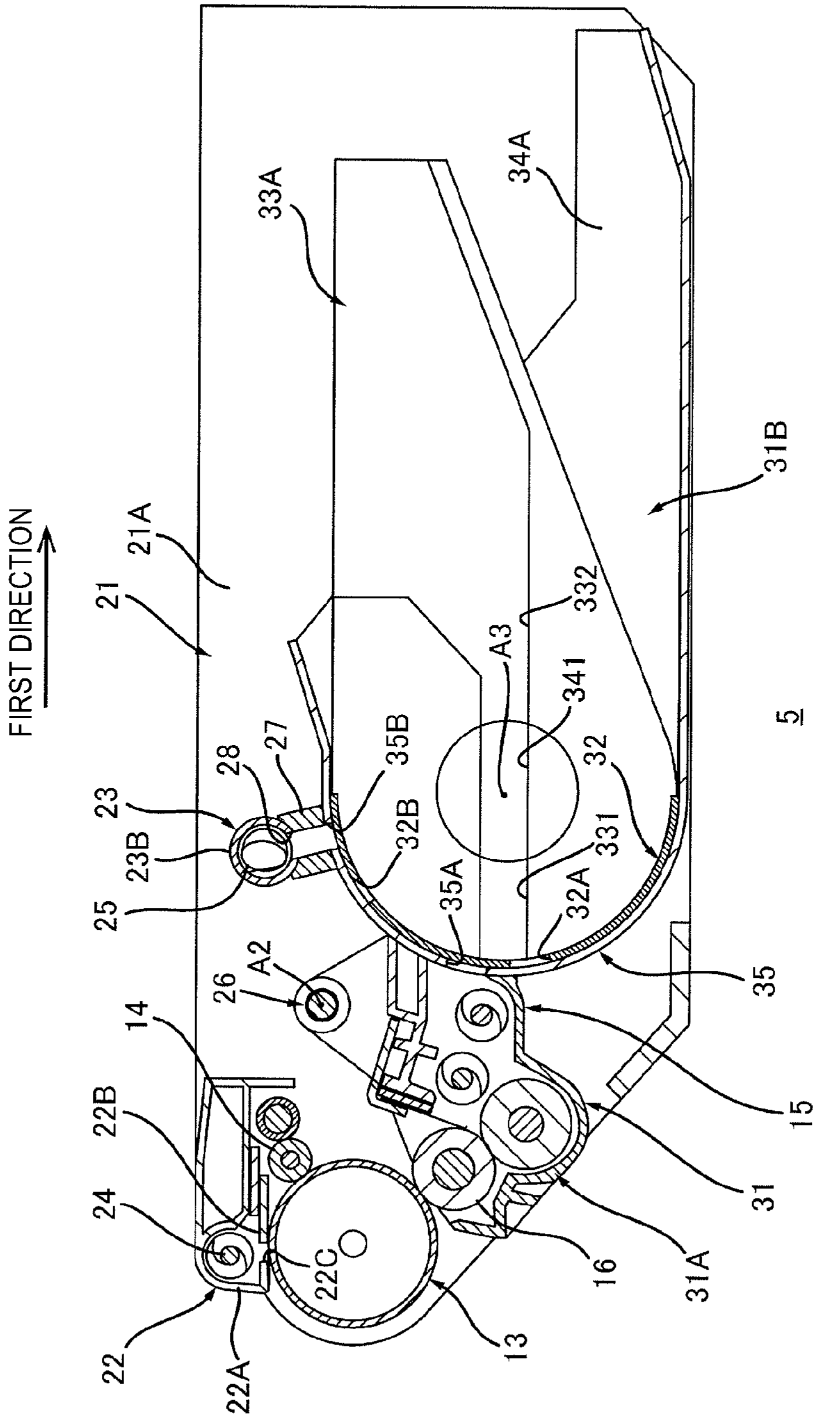
FIG. 4 is a sectional view taken along a line A-A of the drum cartridge shown in FIG. 3.

As shown in FIG. 4, the drum cleaner 22 includes a drum cleaner frame 22A, and a cleaning member 22B. That is, the drum cartridge 5 includes the cleaning member 22B.

The drum cleaner frame 22A is configured to accommodate therein the waste toner removed from the peripheral surface of the photosensitive drum 13 by the cleaning member 22B. The drum cleaner frame 22A is located between the first side plate 21A (see FIG. 3) and the second side plate 21B (see FIG. 3) in the axis direction. The drum cleaner frame 22A extends in the axis direction. In the state where the drum cartridge 5 is mounted to the drawer 4, the drum cleaner frame 22A is located above the photosensitive drum 13. Also, in the state where the drum cartridge 5 is mounted to the drawer 4 and the drawer 4 is located at the inner position, the drum cleaner frame 22A is located between the photosensitive drum 13 and the fixing device 9 (see FIG. 1). The drum cleaner frame 22A has an opening 22C for receiving the waste toner. The opening 22C is configured to communicate with an internal space of the drum cleaner frame 22A.

The cleaning member 22B is configured to remove waste toner from the photosensitive drum 13. The cleaning member 22B is mounted to the drum cleaner frame 22A. The cleaning member 22B extends in the axis direction and has a plate shape. An edge of the cleaning member 22B is located in the opening 22C. The edge of the cleaning member 22B is in contact with the peripheral surface of the photosensitive drum 13. Thereby, when the photosensitive drum 13 is rotated, the toner attached to the peripheral surface of the photosensitive drum 13 is scraped by the edge of the cleaning member 22B and is accommodated in the drum cleaner frame 22A through the opening 22C. In the state where the drum cartridge 5 is mounted to the drawer 4, the cleaning member 22B is located above the photosensitive drum 13. Also, as shown in FIG. 1, in the state where the drum cartridge 5 is mounted to the drawer 4 and the drawer 4 is located at the inner position, the cleaning member 22B is located between the photosensitive drum 13 and the fixing device 9 in the vertical direction.

2.3 Waste Toner Conveying Pipe

As shown in FIG. 3, the waste toner conveying pipe 23 is configured to convey the waste toner removed from the photosensitive drum 13 by the cleaning member 22B (see FIG. 4). The waste toner conveying pipe 23 has a first part 23A and a second part 23B.

The first part 23A is configured to couple the drum cleaner 22 and the second part 23B with each other. The first part 23A is supported by the first side plate 21A. The first part 23A is located at an opposite side to the second side plate 21B with respect to the first side plate 21A in the axis direction. The first part 23A extends in the first direction.

The second part 23B is located between the first side plate 21A and the second side plate 21B in the axis direction. The second part 23B has a cylindrical shape extending in the axis direction. As shown in FIGS. 3 and 4, the second part 23B has a waste toner discharge port 28. That is, the waste toner conveying pipe 23 has the waste toner discharge port 28.

The waste toner in the waste toner conveying pipe 23 is discharged through the waste toner discharge port 28. The waste toner discharge port 28 is located at a substantial center between the first side plate 21A and the second side plate 21B in the axis direction.

2.4 First Screw

As shown in FIGS. 3 and 4, the first screw 24 is located in the drum cleaner frame 22A. The first screw 24 extends in the axis direction. Thereby, the first screw 24 can convey the waste toner in the drum cleaner frame 22A in the axis direction. The first screw 24 is, specifically, an auger screw.

2.5 Second Screw

As shown in FIG. 3, the second screw 25 is located in the waste toner conveying pipe 23. The second screw 25 extends in the direction in which the waste toner conveying pipe 23 extends. The second screw 25 is configured to convey the waste toner conveyed by the first screw 24 to the waste toner discharge port 28. The second screw 25 is, specifically, a shaftless screw.

2.6 Shaft

As shown in FIGS. 3 and 4, the shaft 26 is located between the photosensitive drum 13 and the waste toner conveying pipe 23 in the first direction. The shaft 26 extends in the axis direction. Specifically, the shaft 26 extends along a swing shaft A2 (see FIG. 4) of the developing device 15. The shaft 26 has a circular column shape. The shaft 26 is supported by the frame 21. Specifically, the shaft 26 has one end portion and the other end portion in the axis direction. The other end portion is spaced from the one end portion in the axis direction. The one end portion of the shaft 26 penetrates the first side plate 21A. The other end portion of the shaft 26 penetrates the second side plate 21B. The one end portion of the shaft 26 penetrates the first side plate 21A and the other end portion of the shaft 26 penetrates the second side plate 21B, so that the shaft 26 is supported by the frame 21.

2.7 Developing Device

As shown in FIG. 4, the developing device 15 includes a developing frame 31, a first shutter 32, a lever 33A, and a lever 33B (see FIG. 3), in addition to the developing roller 16.

2.7.1 Developing Frame

As shown in FIG. 3, the developing frame 31 is located between the first side plate 21A and the second side plate 21B in the axis direction. The developing frame 31 extends in the axis direction. As shown in FIG. 4, the developing frame 31 is mounted to the shaft 26. The developing frame 31 can swing relative to the shaft 26. The developing frame 31 is mounted to the shaft 26, so that the developing device 15 is supported by the frame 21 to be swingable relative to the swing shaft A2. The developing device 15 is supported by the frame 21 to be swingable relative to the swing shaft A2, thereby being capable of moving relative to the photosensitive drum 13. Thereby, the developing device 15 can be moved relative to the photosensitive drum 13, in accordance with vibrations of the developing roller 16, which are generated when the photosensitive drum 13 and the developing roller 16 are rotated.

The developing frame 31 has a toner accommodation part 31A and a toner cartridge support part 31B.

The toner accommodation part 31A is located between the toner cartridge support part 31B and the photosensitive drum 13 in the first direction. The toner accommodation part 31A is configured to support the developing roller 16. The toner accommodation part 31A is configured to accommodate therein the toner that is to be supplied to the developing roller 16.

The toner cartridge support part 31B is configured to support the toner cartridge 7 in a state where the toner cartridge 7 (see FIG. 8) is attached to the drum cartridge 5. The toner cartridge support part 31B has a tray shape. Specifically, the toner cartridge support part 31B has a third side plate 34A, a fourth side plate 34B (see FIG. 3), and a partitioning plate 35.

As shown in FIG. 3, the third side plate 34A is located at one end of the toner cartridge support part 31B in the axis direction. The third side plate 34A extends in the first direction. The third side plate 34A has a guide groove 341, as shown in FIG. 4. The guide groove 341 extends in the first direction. In the state where the toner cartridge 7 is attached to the drum cartridge 5, a rib 46A (see FIG. 5) of the toner cartridge 7 is fitted in the guide groove 341. The rib 46A will be described later.

As shown in FIG. 3, the fourth side plate 34B is located at the other end of the toner cartridge support part 31B in the axis direction. The fourth side plate 34B extends in the first direction. The fourth side plate 34B is located with an interval from the third side plate 34A in the axis direction. In the state where the toner cartridge 7 is attached to the drum cartridge 5, the toner cartridge 7 is located between the third side plate 34A and the fourth side plate 34B in the axis direction. The fourth side plate 34B has a guide groove of which a shape is the same as the guide groove 341 of the third side plate 34A. The guide groove of the fourth side plate 34B is not shown. In the state where the toner cartridge 7 is attached to the drum cartridge 5, a rib 46B (see FIG. 5) of the toner cartridge 7 is fitted in the guide groove of the fourth side plate 34B. The rib 46B will be described later.

The partitioning plate 35 is located between the third side plate 34A and the fourth side plate 34B in the axis direction. The partitioning plate 35 extends in the axis direction. One end of the partitioning plate 35 in the axis direction connects to the third side plate 34A. The other end of the partitioning plate 35 in the axis direction connects to the fourth side plate 34B. As shown in FIG. 4, the partitioning plate 35 is configured to partition the toner accommodation part 31A and the toner cartridge support part 31B. The partitioning plate 35 conforms to an outer surface of the toner cartridge 7 in the state where the toner cartridge 7 (see FIG. 8) is attached to the drum cartridge 5. Specifically, the partitioning plate 35 has a semi-cylindrical shape. The partitioning plate 35 has a toner receiving port 35A and an opening 35B. That is, the developing device 15 has the toner receiving port 35A and the opening 35B.

Figure 8:
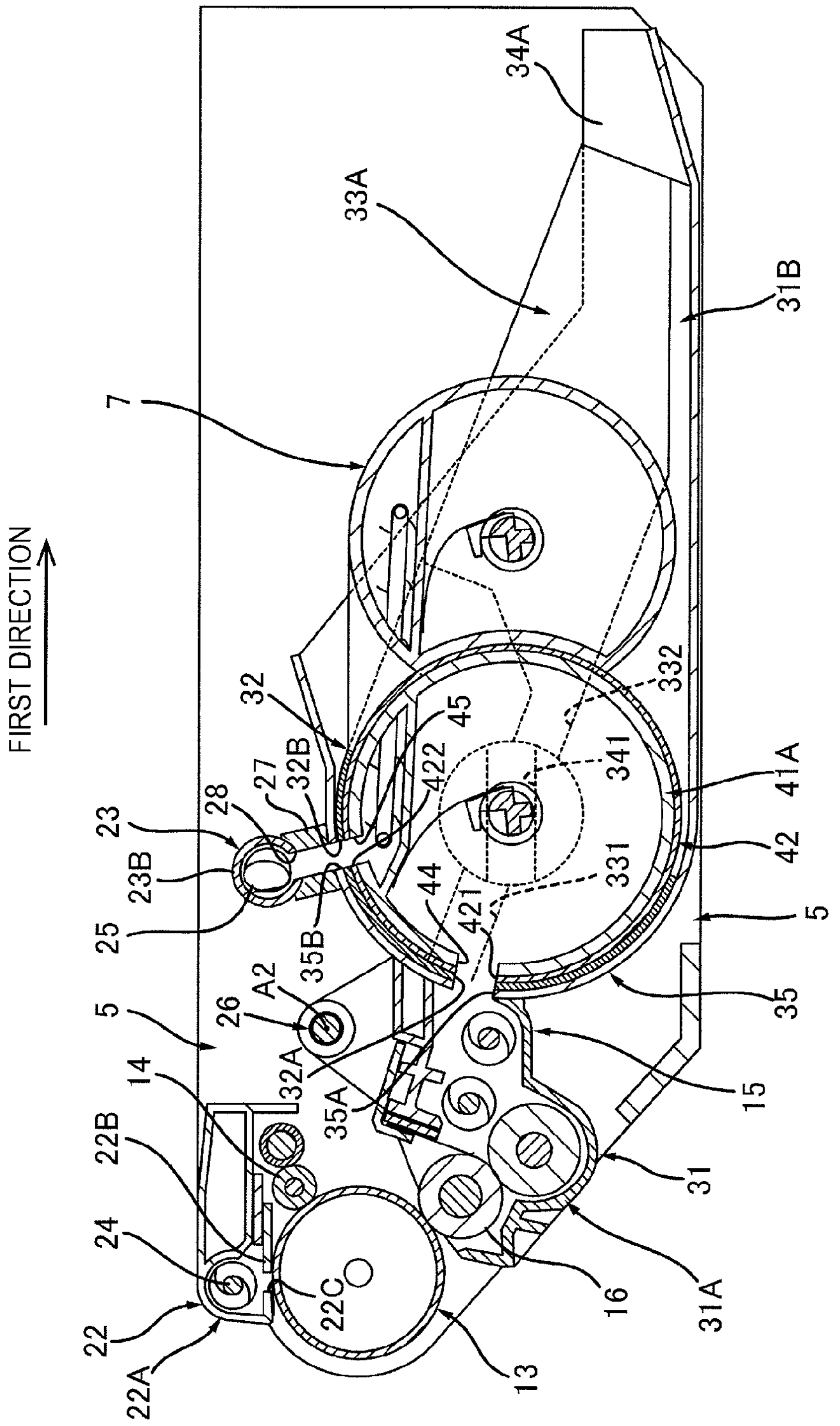
FIG. 8 illustrates attaching of the toner cartridge to the drum cartridge together with FIG. 7, depicting a state where the toner cartridge is attached to the drum cartridge and the lever is located at a second position.

As shown in FIG. 8, the toner receiving port 35A can receive the toner in a state where the toner cartridge 7 is attached to the drum cartridge 5, the first shutter 32 is located at the opening position and the second shutter 42 is located at the opening position. The first shutter 32 and the second shutter 42 will be described later. The toner receiving port 35A is configured to communicate with an internal space of the toner accommodation part 31A. The toner receiving port 35A is located between the third side plate 34A (see FIG. 3) and the fourth side plate 34B (see FIG. 3) in the axis direction. The toner receiving port 35A is located at a center of the developing frame 31 in the axis direction.

The opening 35B is spaced from the toner receiving port 35A in a circumferential direction of the partitioning plate 35. In other words, the opening 35B is spaced from the toner receiving port 35A in a moving direction of the first shutter 32. The opening 35B is located at a center of the developing frame 31 in the axis direction. The opening 35B and the toner receiving port 35A are arranged along the moving direction of the first shutter 32. The opening 35B is configured to communicate with the waste toner discharge port 28 of the waste toner conveying pipe 23. Also, the opening 35B is configured to communicate with the waste toner receiving port 45 of the toner cartridge 7 in a state where the toner cartridge 7 is attached to the developing device 15, the first shutter 32 is located at the opening position, and the second shutter 42 is located at the opening position. The second shutter 42 and the waste toner receiving port 45 will be described later.

2.7.2 First Shutter

As shown in FIGS. 4 and 8, the first shutter 32 is movable relative to the developing frame 31 between a closing position (see FIG. 4) at which the first shutter 32 closes the opening 35B and an opening position (see FIG. 8) at which the first shutter 32 opens the opening 35B. The first shutter 32 has a semi-cylindrical shape conforming to the partitioning plate 35. The first shutter 32 extends in the axis direction. The first shutter 32 can move in the circumferential direction of the partitioning plate 35 along a curve of the partitioning plate 35. The first shutter 32 has an opening 32A and an opening 32B.

As shown in FIG. 8, the opening 32A is configured to communicate with the toner receiving port 35A in a state where the first shutter 32 is located at the opening position. Thereby, the first shutter 32 opens the toner receiving port 35A in the state where the first shutter 32 is located at the opening position. Also, as shown in FIG. 4, the opening 32A is spaced from the toner receiving port 35A and does not communicate with the toner receiving port 35A in the state where the first shutter 32 is located at the closing position. In this case, the first shutter 32 covers the toner receiving port 35A. Thereby, when the first shutter 32 is located at the closing position, the first shutter 32 closes the toner receiving port 35A. The opening 32A is located at a center of the first shutter 32 in the axis direction.

As shown in FIG. 8, the opening 32B is configured to communicate with the opening 35B in the state where the first shutter 32 is located at the opening position. That is, the first shutter 32 opens the opening 35B and the toner receiving port 35A when located at the opening position. Also, as shown in FIG. 4, the opening 32B is spaced from the opening 35B and does not communicate with the opening 35B in the state where the first shutter 32 is located at the closing position. In this case, the first shutter 32 covers the opening 35B. That is, the first shutter 32 closes the opening 35B and the toner receiving port 35A when located at the closing position. The opening 32B and the opening 32A are arranged in the moving direction of the first shutter 32. The opening 32B is located at the center of the first shutter 32 in the axis direction.

2.7.3 Two Levers

As shown in FIGS. 4 and 8, the lever 33A is configured to be movable relative to the developing frame 31 between a first position (see FIG. 4) at which the first shutter 32 is located at the closing position and a second position (see FIG. 8) at which the first shutter 32 is located at the opening position, in the state where the toner cartridge 7 is attached to the drum cartridge 5. The lever 33A connects to one end of the first shutter 32 in the axis direction. The lever 33A is configured to be pivotable relative to a third shaft A3 between the first position and the second position, in the state where the toner cartridge 7 is attached to the drum cartridge 5. As shown in FIG. 4, the lever 33A has a guide groove 331 and a guide groove 332.

The guide groove 331 is located between the first shutter 32 and the guide groove 341 in the first direction, in the state where the lever 33A is located at the first position. In the state where the toner cartridge 7 is attached to the drum cartridge 5, a rib 48 (see FIG. 5) of the toner cartridge 7 is fitted in the guide groove 331. The rib 48 will be described later. The guide groove 331 extends in the first direction in the state where the lever 33A is located at the first position. The guide groove 331 continues to the guide groove 341 in the first direction in the state where the lever 33A is located at the first position.

The guide groove 332 is located at an opposite side to the guide groove 331 with respect to the guide groove 341 in the first direction, in the state where the lever 33A is located at the first position. In the state where the toner cartridge 7 is attached to the drum cartridge 5, a rib 49 (see FIG. 5) of the toner cartridge 7 is fitted in the guide groove 332. The rib 49 will be described later. The guide groove 332 extends in the first direction in the state where the lever 33A is located at the first position. The guide groove 332 continues to the guide groove 341 in the first direction in the state where the lever 33A is located at the first position.

In the state where the lever 33A is located at the first position, the guide groove 331, the guide groove 341 and the guide groove 332 form a linear groove extending in the first direction. Thereby, when a user attaches the toner cartridge 7 to the drum cartridge 5, the rib 48 of the toner cartridge 7 can be guided to the guide groove 331 through the guide groove 332 and the guide groove 341. Also, when the user attaches the toner cartridge 7 to the drum cartridge 5, the rib 46A of the toner cartridge 7 can be guided to the guide groove 341 through the guide groove 332.

In the meantime, as shown in FIG. 8, in the state where the lever 33A is located at the second position, the guide groove 331 and the guide groove 332 are inclined relative to the guide groove 341. Thereby, in the state where the toner cartridge 7 is attached to the drum cartridge 5, when the lever 33A is located at the second position, the rib 48 of the toner cartridge 7 does not pass from the guide groove 331 to the guide groove 341, and the rib 46A of the toner cartridge 7 does not pass from the guide groove 341 to the guide groove 332. For this reason, in the state where the toner cartridge 7 is attached to the drum cartridge 5, when the lever 33A is located at the second position, the toner cartridge 7 cannot be detached from the drum cartridge 5.

2.8 Seal Member

As shown in FIG. 4, the seal member 27 is located between the partitioning plate 35 of the developing device 15 and the waste toner conveying pipe 23. The seal member 27 is configured to seal between the waste toner discharge port 28 and the opening 35B. The seal member 27 is configured to surround the waste toner discharge port 28 and the opening 35B. Thereby, the seal member 27 blocks the waste toner from being leaked from between the waste toner discharge port 28 and the opening 35B. The seal member 27 can be deformed when the developing device 15 is moved relative to the photosensitive drum 13. Specifically, when the developing device 15 is moved in a direction of getting away from the photosensitive drum 13, the seal member 27 is pressed by the partitioning plate 35 and is thus shrunken in a direction in which the opening 35B comes close to the waste toner discharge port 28. Also, when the developing device 15 is moved in a direction of coming close to the photosensitive drum 13, the seal member 27 is restored from the shrunken state by the elasticity and presses the partitioning plate 35 in a direction in which the opening 35B gets away from the waste toner discharge port 28.

3. Details of Toner Cartridge

Subsequently, the toner cartridge 7 is described in detail with reference to FIGS. 5 to 6C.

Figure 5:
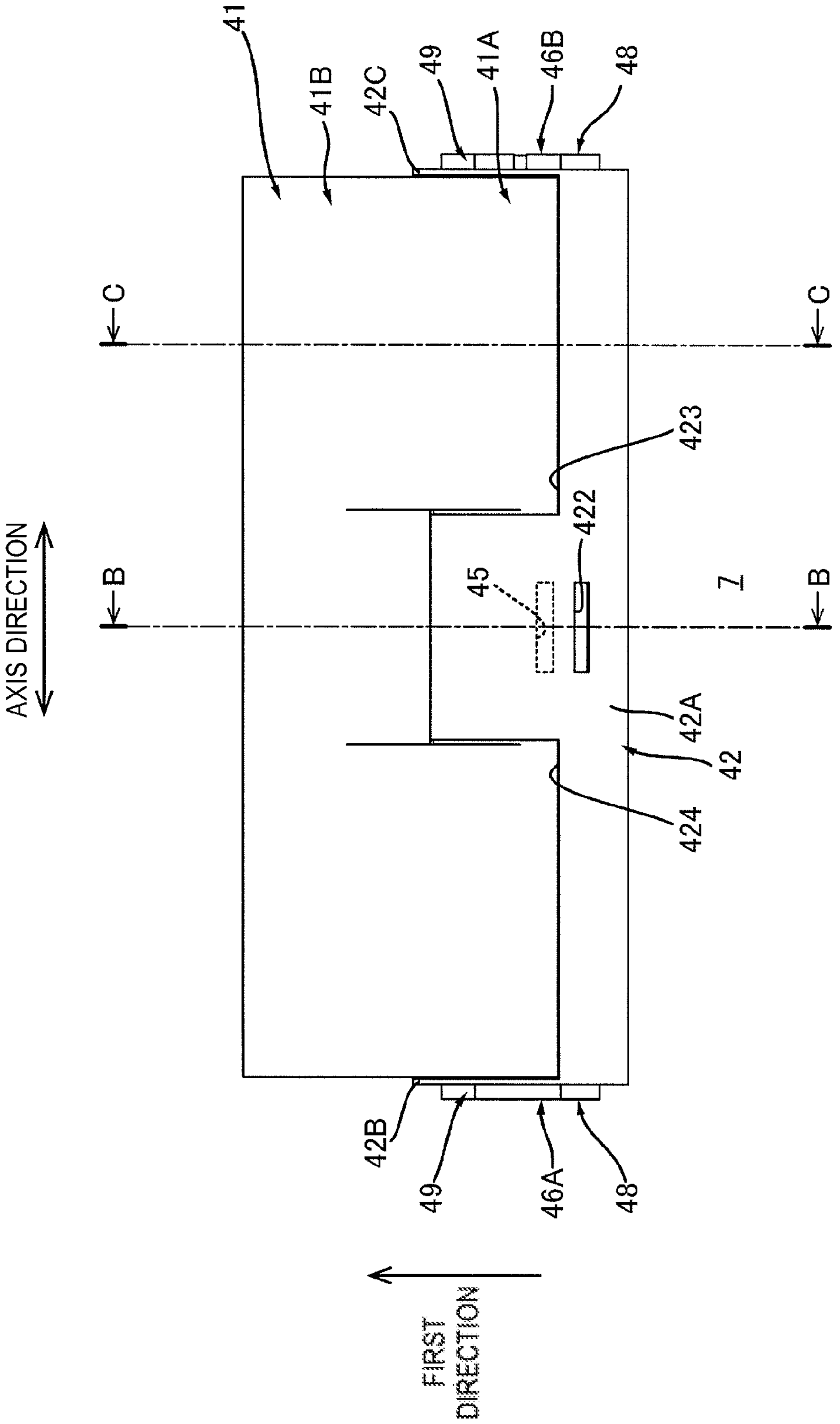
FIG. 5 is a plan view of a toner cartridge shown in FIG. 1.

The toner cartridge 7 shown in FIG. 5 is attachable to and detachable from the toner cartridge support part 31B (see FIG. 3) of the developing device 15. The toner cartridge 7 is configured to be movable relative to the photosensitive drum 13 together with the developing device 15, with being attached to the developing device 15 (see FIG. 8). The toner cartridge 7 includes a housing 41 and a second shutter 42.

3.1 Housing

Figure 6A:
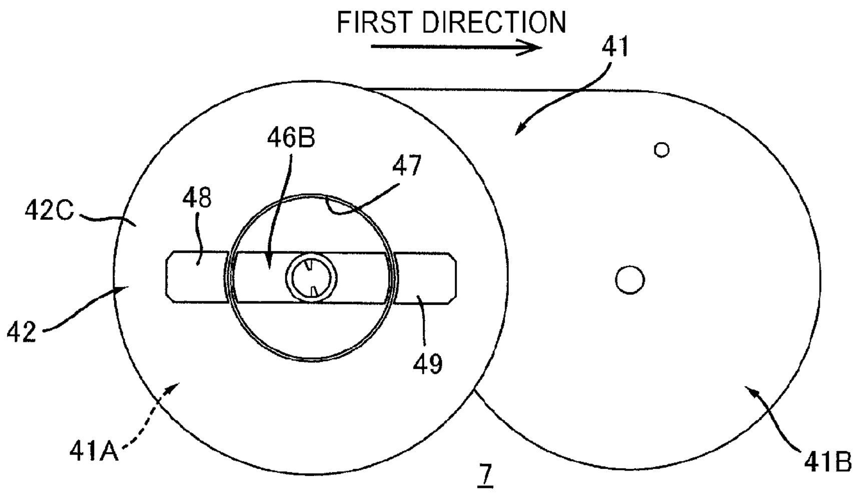
FIG. 6A is a side view of the toner cartridge shown in FIG. 5.

The housing 41 can accommodate therein the toner that is to be supplied to the developing roller 16. As shown in FIG. 6A, the housing 41 has a first cylindrical part 41A and a second cylindrical part 41B.

The first cylindrical part 41A has a cylindrical shape. The first cylindrical part 41A extends in the axis direction in the state where the toner cartridge 7 is attached to the drum cartridge 5.

Figure 6B:
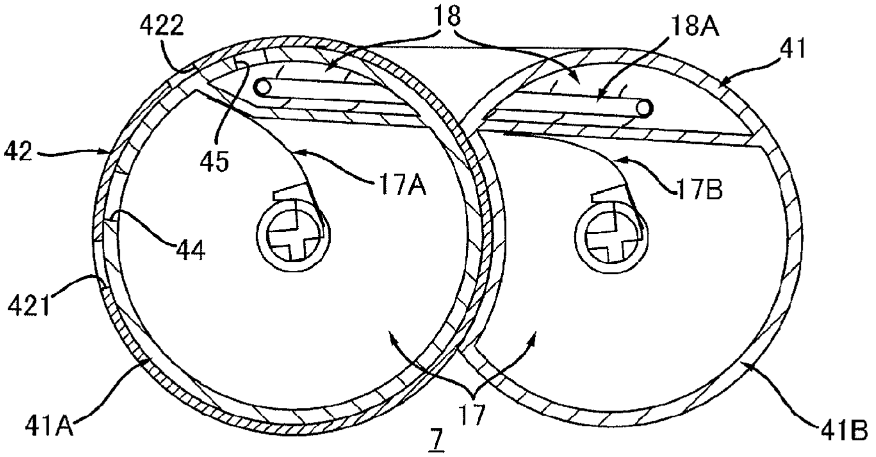
FIG. 6B is a sectional view taken along a line B-B of the toner cartridge shown in FIG. 5.
Figure 6C:
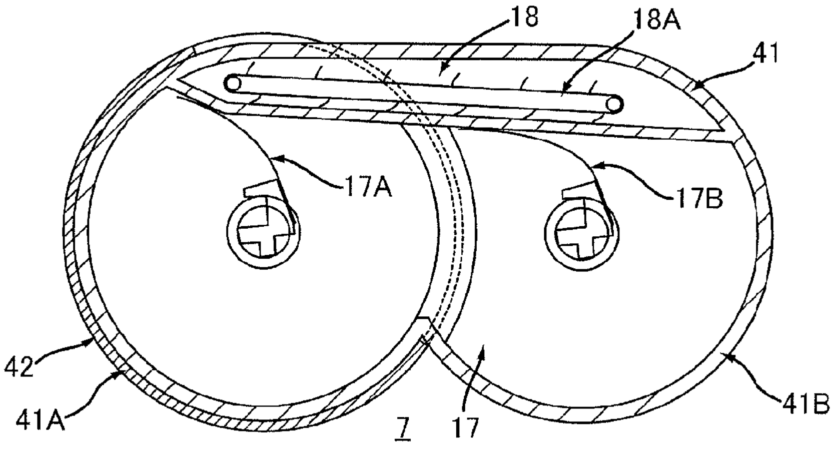
FIG. 6C is a sectional view taken along a line C-C of the toner cartridge shown in FIG. 5.

The second cylindrical part 41B has a cylindrical shape. The second cylindrical part 41B extends in the axis direction in the state where the toner cartridge 7 is attached to the drum cartridge 5. The second cylindrical part 41B and the first cylindrical part 41A are arranged along the first direction in the state where the toner cartridge 7 is attached to the drum cartridge 5. In other words, the second cylindrical part 41B and the first cylindrical part 41A are arranged along a radial direction of the first cylindrical part 41A in the state where the toner cartridge 7 is attached to the drum cartridge 5. As shown in FIGS. 5 and 6C, a part of the second cylindrical part 41B in the axis direction connects to the first cylindrical part 41A in the first direction. In other words, a part of the second cylindrical part 41B in the axis direction connects to the first cylindrical part 41A in the radial direction of the first cylindrical part 41A. Specifically, each of both end portions of the second cylindrical part 41B in the axis direction connects to the first cylindrical part 41A in the first direction, and as shown in FIGS. 5 and 6B, a central portion of the second cylindrical part 41B in the axis direction is spaced from the first cylindrical part 41A in the first direction. An internal space of the second cylindrical part 41B communicates with an internal space of the first cylindrical part 41A at a part at which the first cylindrical part 41A and the second cylindrical part 41B interconnect.

In the housing 41, a part of the first cylindrical part 41A in the radial direction and a part of the second cylindrical part 41B in the radial direction are demarcated as the waste toner container 18. The waste toner container 18 is provided therein with a belt conveyor 18A for conveying the waste toner. Also, a part of the housing 41 except the waste toner container 18 is the toner container 17. The toner container 17 is provided therein with agitators 17A, 17B for stirring the toner. The agitator 17A is located in the first cylindrical part 41A, and the agitator 17B is located in the second cylindrical part 41B.

Also, as shown in FIGS. 5 and 6B, the housing 41 has a toner discharge port 44, a waste toner receiving port 45, a rib 46A, and a rib 46B. That is, the toner cartridge 7 has the toner discharge port 44 and the waste toner receiving port 45.

As shown in FIG. 6B, the toner discharge port 44 is located on a peripheral surface of the first cylindrical part 41A. The toner discharge port 44 is configured to communicate with an internal space of the toner container 17. Through the toner discharge port 44, the toner in the first cylindrical part 41A can be discharged.

The waste toner receiving port 45 is located on the peripheral surface of the first cylindrical part 41A. The waste toner receiving port 45 is spaced from the toner discharge port 44 in a circumferential direction of the first cylindrical part 41A. In other words, the waste toner receiving port 45 is spaced from the toner discharge port 44 in a moving direction of the second shutter 42. The waste toner receiving port 45 and the toner discharge port 44 are arranged along the moving direction of the second shutter 42. The waste toner receiving port 45 is configured to communicate with the waste toner container 18. As shown in FIG. 8, the waste toner from the waste toner conveying pipe 23 can be received through the waste toner receiving port 45, in the state where the toner cartridge 7 is attached to the drum cartridge 5, the first shutter 32 is located at the opening position, and the second shutter 42 is located at the opening position.

As shown in FIG. 5, the rib 46A is located on one side surface of the first cylindrical part 41A in the axis direction. The rib 46A protrudes from one side surface of the first cylindrical part 41A in the axis direction. The rib 46A extends in the radial direction of the first cylindrical part 41A. The rib 46A extends in the first direction in the state where the toner cartridge 7 is attached to the drum cartridge 5. The rib 46A is fitted in the guide groove 341 (see FIG. 4) of the third side plate 34A of the drum cartridge 5 in the state where the toner cartridge 7 is attached to the drum cartridge 5.

The rib 46B is spaced from the rib 46A in the axis direction. The rib 46B is located on the other side surface of the first cylindrical part 41A in the axis direction. The rib 46B protrudes from the other side surface of the first cylindrical part 41A in the axis direction. The rib 46B extends in the radial direction of the first cylindrical part 41A. The rib 46B extends in the first direction in the state where the toner cartridge 7 is attached to the drum cartridge 5. The rib 46B is fitted in the guide groove 341 (not shown) of the fourth side plate 34B of the drum cartridge 5 in the state where the toner cartridge 7 is attached to the drum cartridge 5.

3.2 Second Shutter

The second shutter 42 is configured to be movable relative to the first cylindrical part 41A between the closing position (see FIG. 6B) and the opening position (see FIG. 8). As shown in FIG. 5, the second shutter 42 has a cylindrical part 42A, a first side plate 42B, and a second side plate 42C.

The cylindrical part 42A is configured to cover the peripheral surface of the first cylindrical part 41A. The cylindrical part 42A extends in the axis direction. The cylindrical part 42A has a cylindrical shape. The cylindrical part 42A has a first opening 421 (see FIG. 6B), a second opening 422, a third opening 423 and a fourth opening 424.

As shown in FIG. 8, the first opening 421 communicates with the toner discharge port 44 in the state where the second shutter 42 is located at the opening position. Thereby, the second shutter 42 opens the toner discharge port 44 when located at the opening position. Also, as shown in FIG. 6B, the first opening 421 is distant from the toner discharge port 44 and does not communicate with the toner discharge port 44 in the state where the second shutter 42 is located at the closing position. In this case, the cylindrical part 42A of the second shutter 42 covers the toner discharge port 44. Thereby, the second shutter 42 closes the toner discharge port 44 when located at the closing position.

The second opening 422 is spaced from the first opening 421 in a circumferential direction of the cylindrical part 42A. As shown in FIG. 8, the second opening 422 communicates with the waste toner receiving port 45 in the state where the second shutter 42 is located at the opening position. Thereby, the second shutter 42 opens the waste toner receiving port 45 when located at the opening position. Also, as shown in FIG. 6B, the second opening 422 is distant from the waste toner receiving port 45 and does not communicate with the waste toner receiving port 45 in the state where the second shutter 42 is located at the closing position. In this case, the cylindrical part 42A of the second shutter 42 covers the waste toner receiving port 45. Thereby, the second shutter 42 closes the waste toner receiving port 45 when located at the closing position.

As shown in FIG. 5, the third opening 423 is spaced from the second opening 422 in the axis direction. A connection part of the first cylindrical part 41A and the second cylindrical part 41B passes through the third opening 423.

The fourth opening 424 is located at an opposite side to the third opening 423 with respect to the second opening 422 in the axis direction. The fourth opening 424 is spaced from the second opening 422 in the axis direction. A connection part of the first cylindrical part 41A and the second cylindrical part 41B passes through the fourth opening 424.

The first side plate 42B is configured to cover one side surface of the first cylindrical part 41A in the axis direction. The first side plate 42B is connected to one end portion of the cylindrical part 42A in the axis direction. In the meantime, the first side plate 42B has the same structure as the second side plate 42C, and can be described in the same manner as the second side plate 42C. Therefore, the description of the structure of the first side plate 42B is omitted, and the structure of the second side plate 42C is described in detail.

The second side plate 42C is configured to cover the other side surface of the first cylindrical part 41A in the axis direction. The second side plate 42C is connected to the other end portion of the cylindrical part 42A in the axis direction. The second side plate 42C is spaced from the first side plate 42B in the axis direction. As shown in FIG. 6A, the second side plate 42C has a circular shape. The second side plate 42C has an opening 47, a rib 48 and a rib 49.

The opening 47 exposes the rib 46B of the first cylindrical part 41A. The opening 47 is located at a center of the second side plate 42C in a radial direction of the second side plate 42C. The opening 47 has a circular shape.

The rib 48 protrudes from the second side plate 42C. The rib 48 extends in the radial direction of the second side plate 42C. The rib 48 extends in the first direction in the state where the second shutter 42 is located at the closing position. The rib 48 is fitted in the guide groove 331 of the fourth side plate 34B (see FIG. 3) of the drum cartridge 5 in the state where the toner cartridge 7 is attached to the drum cartridge 5.

The rib 49 protrudes from the second side plate 42C. The rib 49 extends in the radial direction of the second side plate 42C. The rib 49 is located at an opposite side to the rib 48 with respect to the opening 47 in the first direction, in the state where the second shutter 42 is located at the closing position. In the state where the second shutter 42 is located at the closing position, the rib 49 forms a linear rib extending in the first direction, together with the rib 46B and the rib 48. The rib 49 is fitted in the guide groove 332 of the fourth side plate 34B (see FIG. 3) of the drum cartridge 5, in the state where the toner cartridge 7 is attached to the drum cartridge 5.

The rib 48 of the first side plate 42B is fitted in the guide groove 331 of the lever 33A and the rib 49 of the first side plate 42B is fitted in the guide groove 332 of the lever 33A, so that the lever 33A and the first side plate 42B are connected to each other and can rotate together. Also, the rib 48 of the second side plate 42C is fitted in the guide groove 331 of the lever 33B and the rib 49 of the second side plate 42C is fitted in the guide groove 332 of the lever 33B, so that the lever 33B and the second side plate 42C are connected to each other and can rotate together.

When the first side plate 42B is rotated together with the lever 33A and the second side plate 42C is rotated together with the lever 33B, the first shutter 32 moves together with the second shutter 42. That is, the first shutter 32 is capable of moving together with the second shutter 42 in the state where the toner cartridge 7 is attached to the drum cartridge 5.

4. Attaching and Detaching of Toner Cartridge to and from Drum Cartridge

Subsequently, attaching and detaching of the toner cartridge 7 to and from the drum cartridge 5 are described with reference to FIGS. 2, 7 and 8.

As shown in FIG. 2, the user can attach and detach the toner cartridge 7 to and from the drum cartridge 5 in a state where the drawer 4 having the drum cartridge 5 mounted thereto is located at the outer position.

Figure 7:
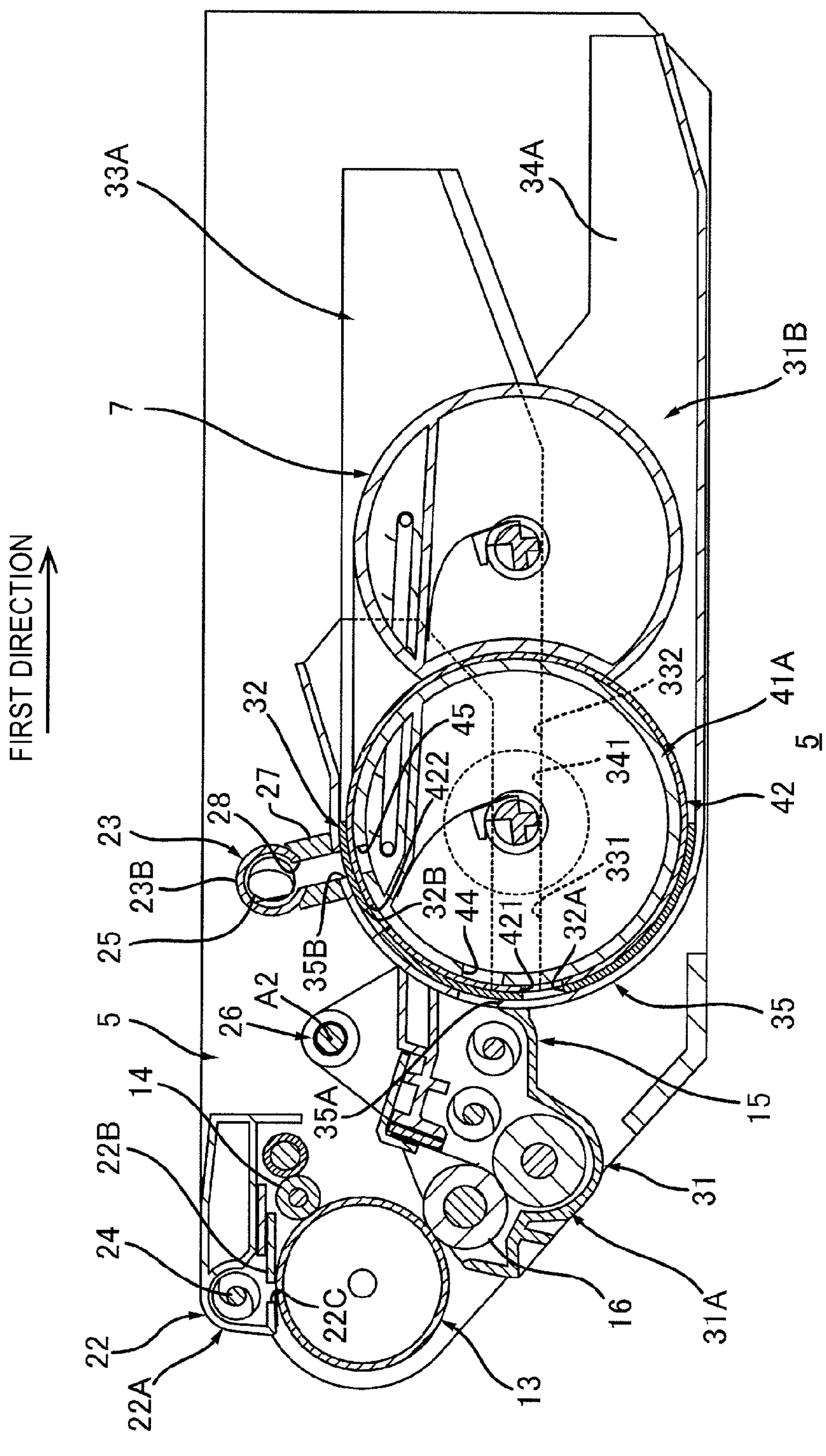
FIG. 7 illustrates attaching of the toner cartridge to the drum cartridge, depicting a state where the toner cartridge is attached to the drum cartridge and a lever is located at a first position.

Specifically, as shown in FIG. 7, the user attaches the toner cartridge 7 to the drum cartridge 5 in the state where the lever 33A is located at the first position and the lever 33B (see FIG. 3) is located at the first position. At this time, the lever 33A is located at the first position and the lever 33B is located at the first position, so that the first shutter 32 is located at the closing position. Also, the second shutter 42 is located at the closing position.

When the toner cartridge 7 is attached to the drum cartridge 5, the rib 48 (see FIG. 5) is fitted in the guide groove 331 (see FIG. 7), the rib 49 (see FIG. 5) is fitted in the guide groove 332 (see FIG. 7) and the rib 46A (see FIG. 5) is fitted in the guide groove 341 (see FIG. 7), so that the lever 33A of the drum cartridge 5 and the first side plate 42B of the toner cartridge 7 can be rotated together. Thereby, the first shutter 32 can be moved together with the second shutter 42 can be moved together.

Then, as shown in FIGS. 7 and 8, the user moves the lever 33A from the first position to the second position, and moves the lever 33B (see FIG. 3) from the first position to the second position.

Thereby, the first side plate 42B is rotated together with the lever 33A and the second side plate 42C is rotated together with the lever 33B, so that the first shutter 32 is moved from the closing position to the opening position and the second shutter 42 is moved from the closing position to the opening position.

Then, as shown in FIG. 8, when the first shutter 32 is located at the opening position and the second shutter 42 is located at the opening position, the attaching of the toner cartridge 7 to the drum cartridge 5 is completed.

Also, as shown in FIGS. 7 and 8, when detaching the toner cartridge 7 from the drum cartridge 5, the user moves the lever 33A from the second position to the first position, and moves the lever 33B from the second position to the first position.

Thereby, the first side plate 42B is rotated together with the lever 33A and the second side plate 42C is rotated together with the lever 33B, so that the first shutter 32 is moved from the opening position to the closing position and the second shutter 42 is moved from the opening position to the closing position.

Then, after the first shutter 32 is located at the closing position and the second shutter 42 is located at the closing position, the user detaches the toner cartridge 7 from the drum cartridge 5.

In the meantime, the toner cartridge 7 may be attached to and detached from the drum cartridge 5 in a state where the drum cartridge 5 is demounted from the drawer 4.

5. Operational Effects

As shown in FIG. 8, in the image forming apparatus 1, the drum cartridge 5 is capable of being mounted to the drawer 4 and the toner cartridge 7 is capable of being attached to the drum cartridge 5.

For this reason, in the image forming apparatus 1 where the cleaning member 22B is located between the photosensitive drum 13 and the fixing device 9 in the state where the drum cartridge 5 is mounted to the drawer 4 and the drawer 4 is located at the inner position, it is possible to individually replace the drum cartridge 5 and the toner cartridge 7, as shown in FIG. 2.

Thereby, it is possible to replace each of the drum cartridge 5 and the toner cartridge 7 at an appropriate time, in accordance with each lifetime.

Also, in the image forming apparatus 1, it is possible to convey the waste toner removed by the cleaning member 22B to the waste toner container 18 (see FIG. 1) through the waste toner conveying pipe 23 (see FIG. 5), and to replace the waste toner container 18 together with the toner container 17, as shown in FIG. 2.

Also, as shown in FIG. 4, in the image forming apparatus 1, the developing device 15 is swingably supported by the frame 21, so that the toner cartridge 7 can be moved relative to the photosensitive drum 13 together with the developing device 15 in the state where the toner cartridge 7 is attached to the drum cartridge 5.

Thereby, in the state where the waste toner container 18 is fixed to the drum cartridge 5, the toner cartridge 7 can swing relative to the photosensitive drum 13 together with the developing device 15, in accordance with vibrations of the developing roller 16 which are generated when the photosensitive drum 13 and the developing roller 16 are rotated.

6. Second Exemplary Embodiment

Subsequently, a second exemplary embodiment is described with reference to FIGS. 9 to 11B. In the second exemplary embodiment, the same members as the first exemplary embodiment are denoted with the same reference numerals, and the descriptions thereof are omitted.

6.1 Outline of Second Exemplary Embodiment

Figure 9:
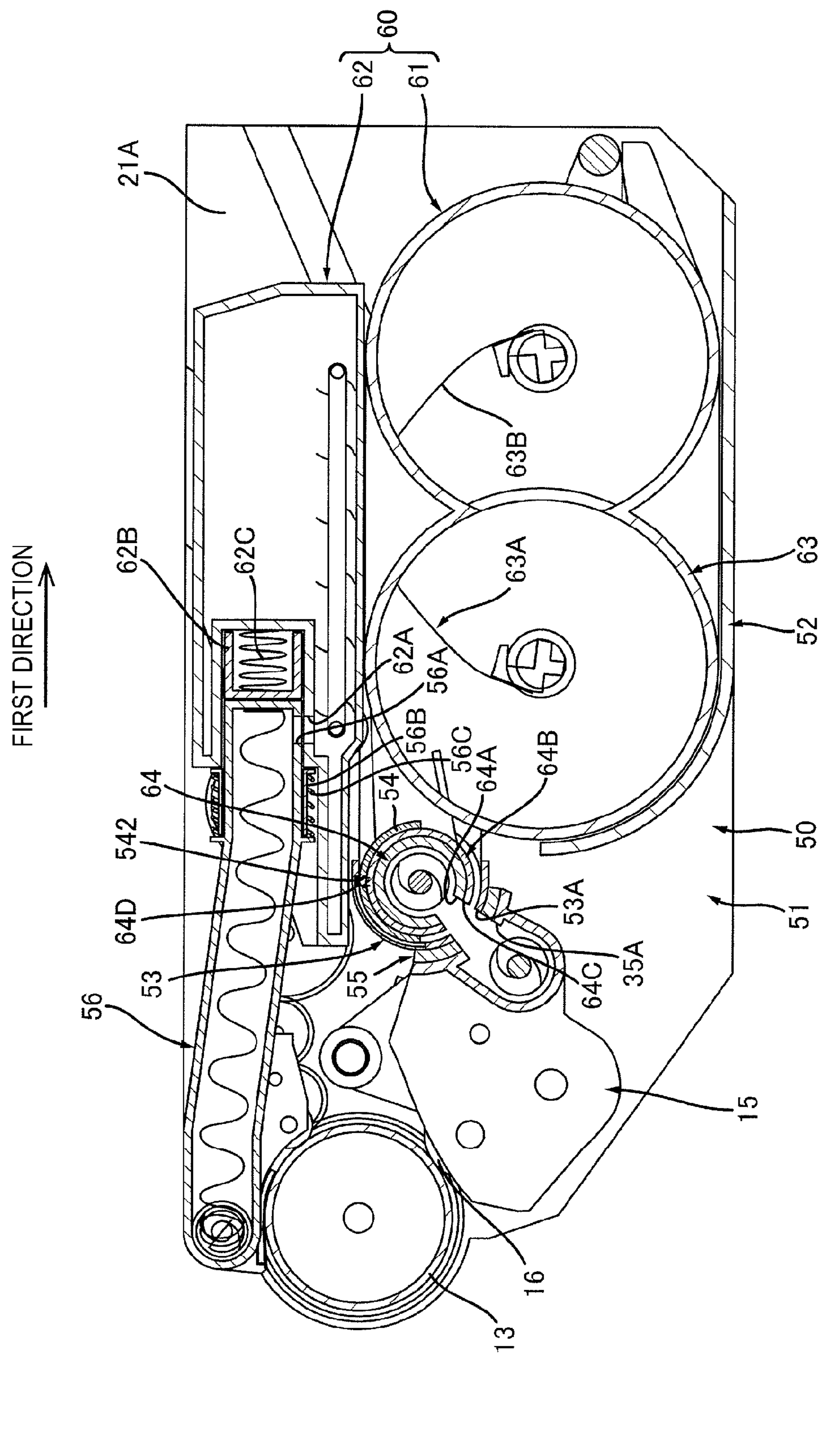
FIG. 9 illustrates a second exemplary embodiment, depicting a state where the toner cartridge is attached to the drum cartridge.

As shown in FIG. 9, a toner cartridge 60 is attachable to and detachable from a frame 51 of a drum cartridge 50. In this case, the developing device 15 is not provided with the toner cartridge support part 31B, and is configured to be movable relative to the photosensitive drum 13 and the toner cartridge 60 in a state where the toner cartridge 60 is attached to the drum cartridge 50.

Hereinafter, the second exemplary embodiment is described in detail.

6.2 Details of Drum Cartridge

The frame 51 of the drum cartridge 50 includes a toner cartridge support part 52, a wall 53, a first shutter 54, a seal member 55, and a waste toner conveying pipe 56, unlike the frame 21 of the drum cartridge 5 of the first exemplary embodiment.

6.2.1 Toner Cartridge Support Part

The toner cartridge support part 52 is configured to support a housing 63 of the toner cartridge 60 in the state where the toner cartridge 60 is attached to the drum cartridge 50. The toner cartridge 60 will be described later. The toner cartridge support part 52 is located between the first side plate 21A and the second side plate 21B in the axis direction.

The toner cartridge support part 52 has a plate shape extending in the axis direction.

6.2.2 Wall

The wall 53 is located between the developing device 15 and the toner cartridge support part 52 in the first direction. The wall 53 is configured to support a toner discharge part 64 of the toner cartridge 60 in a state where the toner cartridge 60 is attached to the frame 51. The wall 53 is located between a toner discharge port 64A and a toner receiving port 35A in the state where the toner cartridge 60 is attached to the frame 51. Also, the wall 53 is located between the first side plate 21A and the second side plate 21B in the axis direction. The wall 53 has a semi-cylindrical shape extending in the axis direction. The wall 53 has an opening 53A.

The opening 53A is located between the first side plate 21A and the second side plate 21B in the axis direction. The opening 53A communicates with the toner receiving port 35A.

6.2.3 First Shutter

Figure 10:
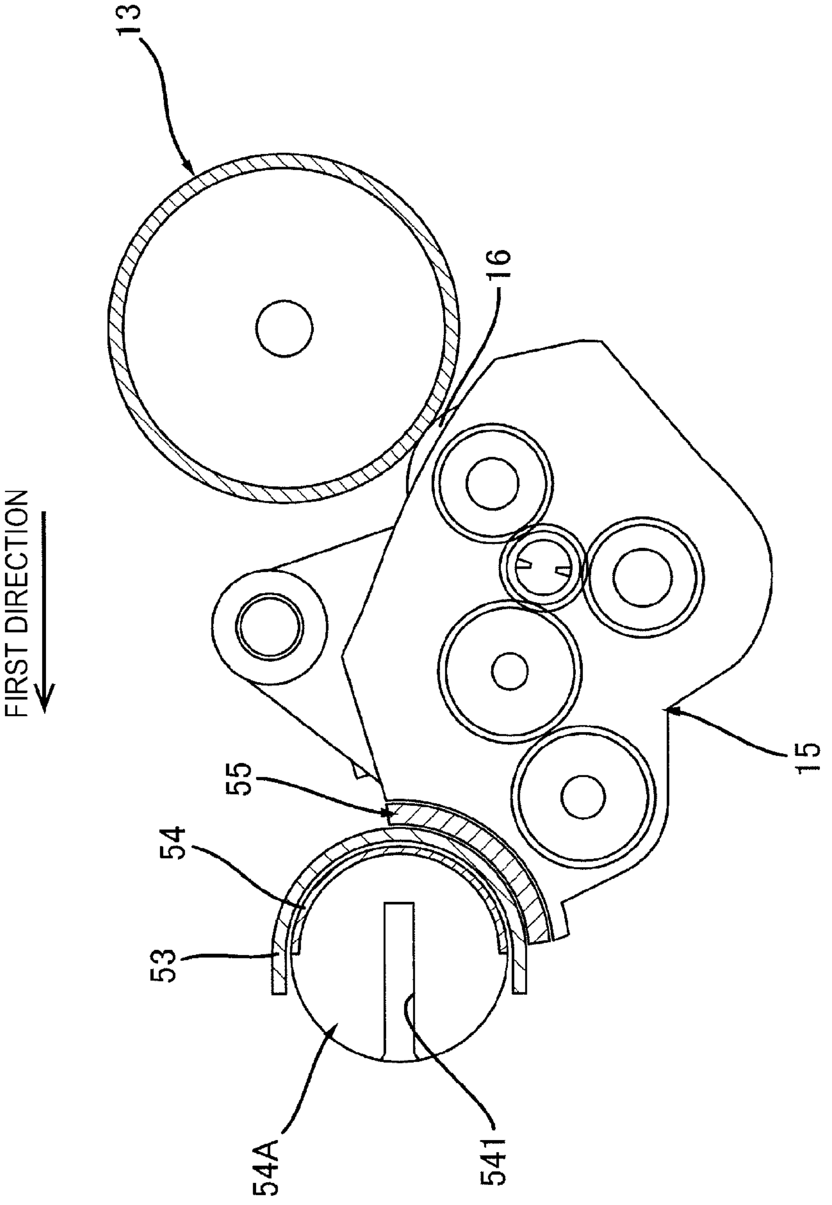
FIG. 10 illustrates a first shutter shown in FIG. 9, depicting a state where the first shutter is located at a closing position.

The first shutter 54 is configured to be movable relative to the wall 53 between a closing position (see FIG. 10) at which the first shutter 54 closes the opening 53A and an opening position (see FIG. 9) at which the first shutter 54 opens the opening 53A. As shown in FIG. 10, the first shutter 54 has a semi-cylindrical shape conforming to the wall 53. The first shutter 54 extends in the axis direction. The first shutter 54 is configured to be rotatable in a circumferential direction of the wall 53 between the closing position and the opening position. Also, the first shutter 54 has a side plate 54A and a side plate 54B (not shown).

The side plate 54A is located at one end portion of the first shutter 54 in the axis direction. The side plate 54A has a groove 541. In the state where the toner cartridge 60 is attached to the frame 51, a rib 67A (see FIG. 11A) of the toner cartridge 60 is fitted in the groove 541. The rib 67A will be described later.

The side plate 54B (not shown) is spaced from the side plate 54A in the axis direction. The side plate 54B (not shown) is located at the other end portion of the first shutter 54 in the axis direction. The side plate 54B (not shown) has a groove of which a shape is the same as the groove 541 of the side plate 54A.

6.2.4 Seal Member

As shown in FIGS. 9 and 10, the seal member 55 is located between the wall 53 and the developing device 15. The seal member 55 is configured to seal a part between the opening 53A and the toner receiving port 35A. The seal member 55 is configured to surround the opening 53A and the toner receiving port 35A. Thereby, the seal member 55 prevents the waste toner from being leaked from between the opening 53A and the toner receiving port 35A. The seal member 55 can be deformed when the developing device 15 is moved relative to the photosensitive drum 13. Specifically, when the developing device 15 is moved in the direction of getting away from the photosensitive drum 13, the seal member 55 is pressed by the developing device 15 and is thus shrunken in a direction in which the toner receiving port 35A comes close to the opening 53A. Also, when the developing device 15 is moved in the direction of coming close to the photosensitive drum 13, the seal member 55 is restored from the shrunken state by the elasticity and presses the developing device 15 in a direction in which the toner receiving port 35A gets away from the opening 53A.

6.2.5 Waste Toner Conveying Pipe

The waste toner conveying pipe 56 shown in FIG. 9 conveys the waste toner removed from the photosensitive drum 13 by the cleaning member 22B (see FIG. 4). The waste toner conveying pipe 56 extends in the first direction. The waste toner conveying pipe 56 is connected to a waste toner container 62 of the toner cartridge 60 in the state where the toner cartridge 60 is attached to the drum cartridge 50. The waste toner conveying pipe 56 has a waste toner discharge port 56A, a shutter 56B, and a compression spring 56C. Through the waste toner discharge port 56A, the waste toner in the waste toner conveying pipe 56 is discharged. The shutter 56B is configured to be movable between an opening position (see FIG. 9) at which the shutter 56B opens the waste toner discharge port 56A and a closing position (not shown) at which the shutter 56B closes the waste toner discharge port 56A. The compression spring 56C is configured to press the shutter 56B from the opening position toward the closing position. When the toner cartridge 60 is being attached to the drum cartridge 50, the shutter 56B comes into contact with the waste toner container 62 and is thus moved from the opening position to the closing position against a pressing force of the compression spring 56C. Also, when the toner cartridge 60 is being detached from the drum cartridge 50, the shutter 56B is pressed by the compression spring 56C and is thus moved from the opening position to the closing position.

6.3 Details of Toner Cartridge

Figure 11A:
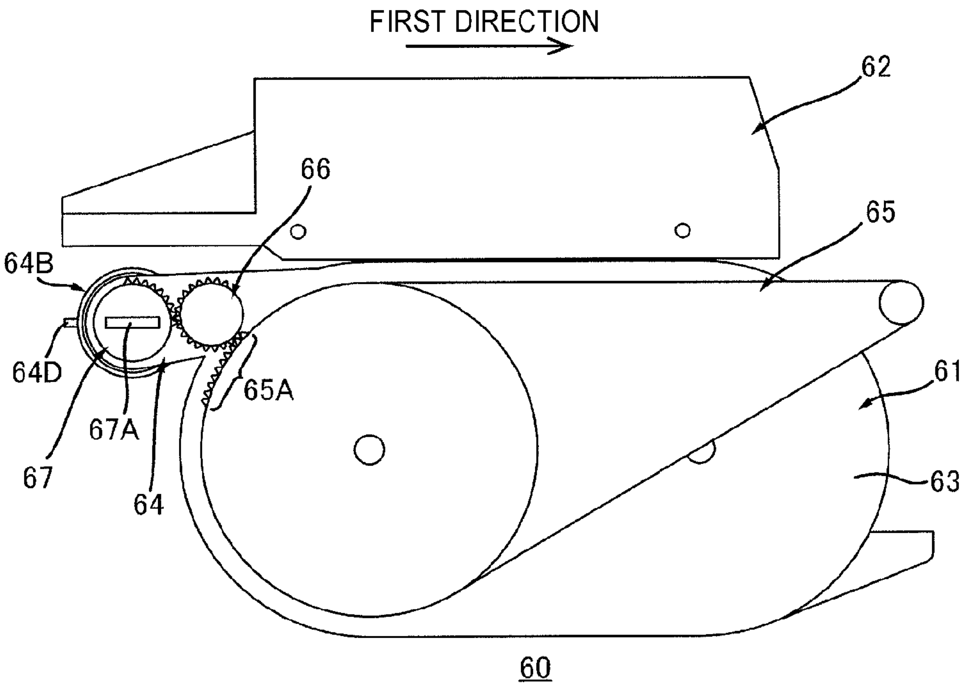
FIG. 11A is a side view of the toner cartridge shown in FIG. 9, depicting a state where the lever is located at the first position.

As shown in FIGS. 9 and 11A, the toner cartridge 60 includes a toner container 61 and the waste toner container 62.

6.3.1 Toner Container

The toner container 61 includes a housing 63, a toner discharge part 64, a lever 65, a gear 66 and a gear 67.

As shown in FIG. 9, the housing 63 can accommodate therein the toner that is to be supplied to the developing roller 16. In the housing 63, two agitators 63A, 63B are provided. The agitator 63A is located between the agitator 63B and the toner discharge part 64. The agitator 63A and the agitator 63B are configured to stir the toner in the housing 63 and to convey the toner in the housing 63 toward the toner discharge part 64.

Through the toner discharge part 64, the toner in the housing 63 can be discharged. The toner discharge part 64 extends from the housing 63. An internal space of the toner discharge part 64 communicates with an internal space of the housing 63. Thereby, the toner in the housing 63 is received into the toner discharge part 64. The toner discharge part 64 has a toner discharge port 64A and a second shutter 64B.

The toner discharge port 64A communicates with the internal space of the toner discharge part 64. Thereby, the toner in the toner discharge part 64 can be discharged through the toner discharge port 64A.

Figure 11B:
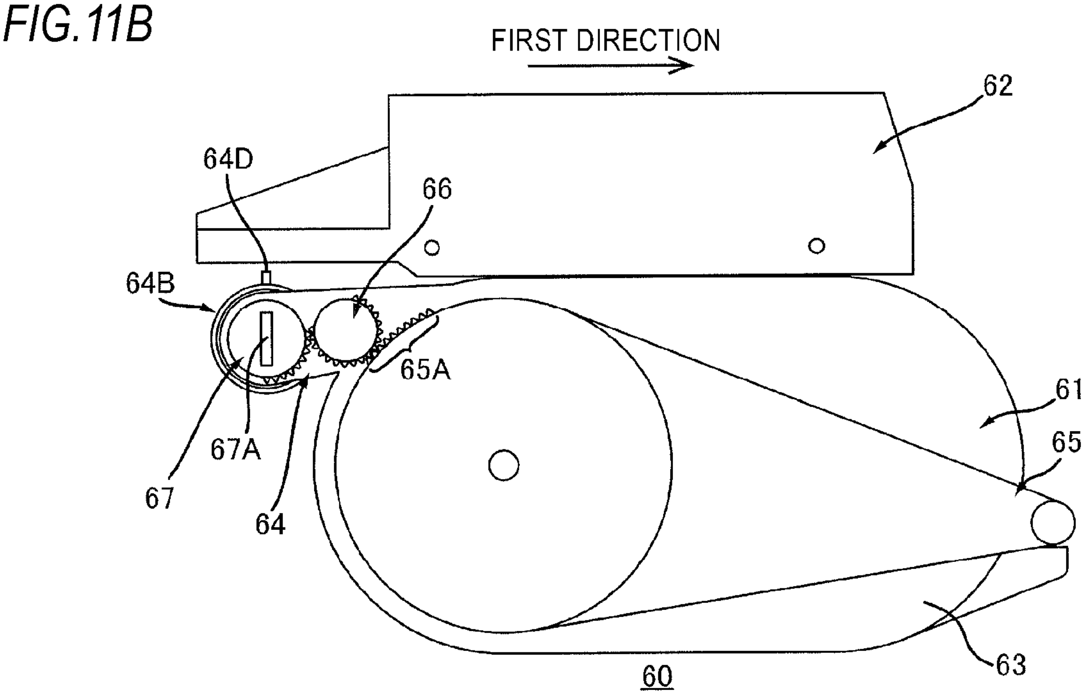
FIG. 11B is a side view of the toner cartridge shown in FIG. 9, depicting a state where the lever is located at the second position.

The second shutter 64B is configured to be movable between the closing position (see FIG. 11A) and the opening position (see FIGS. 9 and 11B). The second shutter 64B has an opening 64C. The opening 64C communicates with the toner discharge port 64A when the second shutter 64B is located at the opening position. Thereby, the second shutter 64B opens the toner discharge port 64A when located at the opening position. Also, when the second shutter 64B is located at the closing position, the opening 64C is distant from the toner discharge port 64A in a moving direction of the second shutter 64B, and does not communicate with the toner discharge port 64A. In this case, the second shutter 64B covers the toner discharge port 64A. Thereby, the second shutter 64B closes the toner discharge port 64A when located at the closing position. Also, the second shutter 64B has a projection 64D. The projection 64D is fitted in a hole 542 (see FIG. 9) of the first shutter 54 in the state where the toner cartridge 60 is attached to the drum cartridge 50. Thereby, in the state where the toner cartridge 60 is attached to the drum cartridge 50, the second shutter 64B can be moved together with the first shutter 54.

As shown in FIG. 11A, the lever 65 is located on an axially outer surface of the housing 63. The lever 65 is configured to be pivotable between a first position (see FIG. 11A) at which the second shutter 64B is located at the closing position and a second position (see FIG. 11B) at which the second shutter 64B is located at the opening position. The lever 65 has a plurality of gear teeth 65A. The plurality of gear teeth 65A is aligned in a pivoting direction of the lever 65.

The gear 66 is in mesh with the gear teeth 65A of the lever 65.

The gear 67 is in mesh with the gear 66. The gear 67 can be independently rotated from the second shutter 64B in a state where the toner cartridge 60 is detached from the drum cartridge 50. The gear 67 has a rib 67A. The rib 67A extends in the first direction in the state where the lever 65 is located at the first position. The rib 67A extends in a direction intersecting with the first direction in the state where the lever 65 is located at the second position. The rib 67A is fitted in the groove 541 (see FIG. 10) of the first shutter 54 in the state where the toner cartridge 60 is attached to the drum cartridge 50. Thereby, in the state where the toner cartridge 60 is attached to the drum cartridge 50, the gear 67 can be rotated together with the first shutter 54.

6.3.2 Waste Toner Container

As shown in FIG. 11A, the waste toner container 62 is mounted to the housing 63. The waste toner container 62 can be attached to and detached from the drum cartridge 50 (see FIG. 9), together with the toner container 61. The waste toner container 62 has a waste toner receiving port 62A, a shutter 62B, and a compression spring 62C, as shown in FIG. 9.

The waste toner receiving port 62A communicates with the waste toner discharge port 56A of the waste toner conveying pipe 56 in the state where the toner cartridge 60 is attached to the drum cartridge 50. Thereby, in the state where the toner cartridge 60 is attached to the drum cartridge 50, the waste toner from the waste toner conveying pipe 56 can be received through the waste toner receiving port 62A. The waste toner receiving port 62A communicates with the internal space of the waste toner container 62. Thereby, the waste toner received into the waste toner receiving port 62A is accommodated in the waste toner container 62.

The shutter 62B is configured to be movable between a closing position (not shown) at which the shutter 62B closes the waste toner receiving port 62A and an opening position (see FIG. 9) at which the shutter 62B opens the waste toner receiving port 62A. When the toner cartridge 60 is being attached to the drum cartridge 50, the shutter 62B comes into contact with the waste toner conveying pipe 56, and is thus moved from the closing position to the opening position against a pressing force of the compression spring 62C. Also, when the toner cartridge 60 is being detached from the drum cartridge 50, the shutter 62B is pressed by the compression spring 62C and is thus moved from the opening position to the closing position.

6.4 Operational Effects of Second Exemplary Embodiment

Also in the second exemplary embodiment, it is possible to accomplish the same effects as the first exemplary embodiment.

7. Third Exemplary Embodiment

Subsequently, a third exemplary embodiment is described with reference to FIGS. 12 to 14. In the third exemplary embodiment, the same members as the first exemplary embodiment are denoted with the same reference numerals, and the descriptions thereof are omitted.

7.1 Outline of Third Exemplary Embodiment

Figure 12:
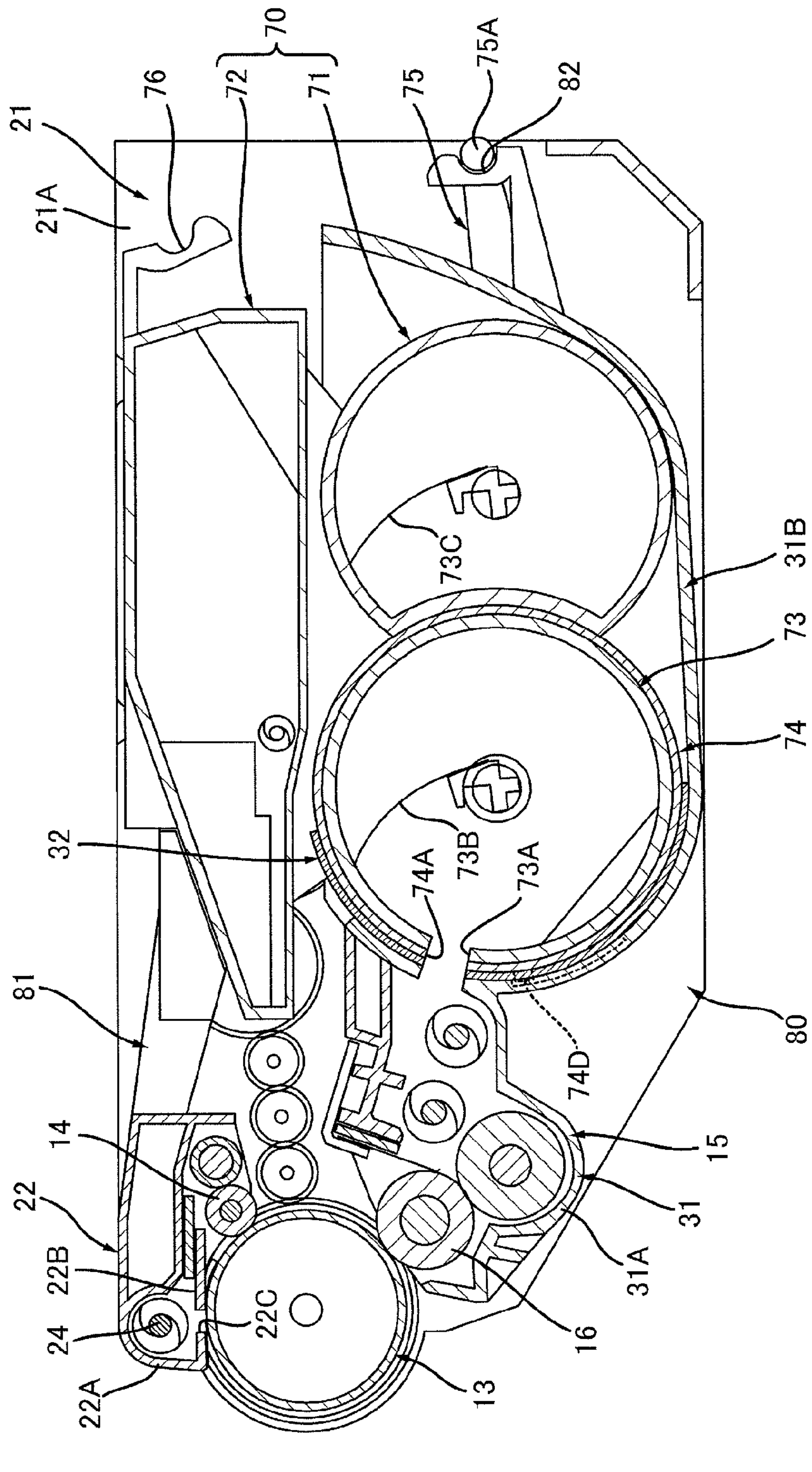
FIG. 12 illustrates a third exemplary embodiment, depicting a state where the toner cartridge is attached to the drum cartridge.

As shown in FIG. 12, a toner container 71 is supported by the toner cartridge support part 31B of the developing device 15, and a waste toner container 72 is supported by the first side plate 21A and the second side plate 21B of the frame 21. The toner container 71 is configured to be movable relative to the photosensitive drum 13 together with the developing device 15 in a state where the toner cartridge 70 is attached to a drum cartridge 80. In the meantime, the waste toner container 72 is configured to be immovable relative to the photosensitive drum 13 in the state where the toner cartridge 70 is attached to the drum cartridge 80.

Hereinafter, the third exemplary embodiment is described in detail.

7.2 Details of Toner Cartridge

Figure 13A:
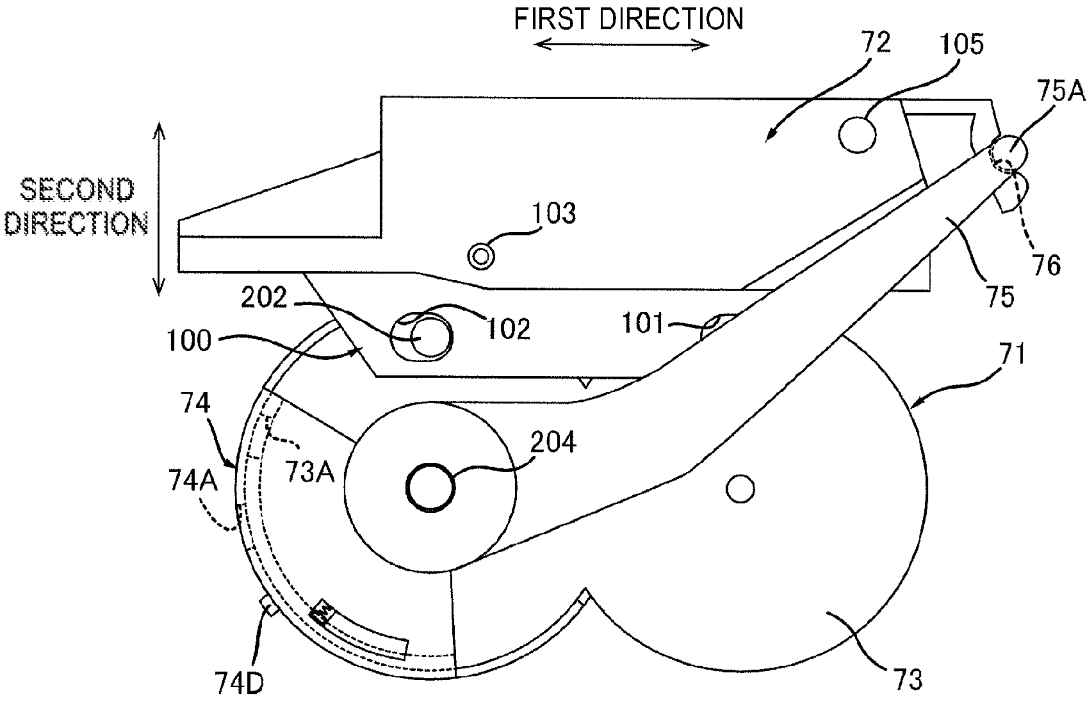
FIG. 13A is a side view of the toner cartridge shown in FIG. 12, depicting a state where the lever is located at the first position.
Figure 13B:
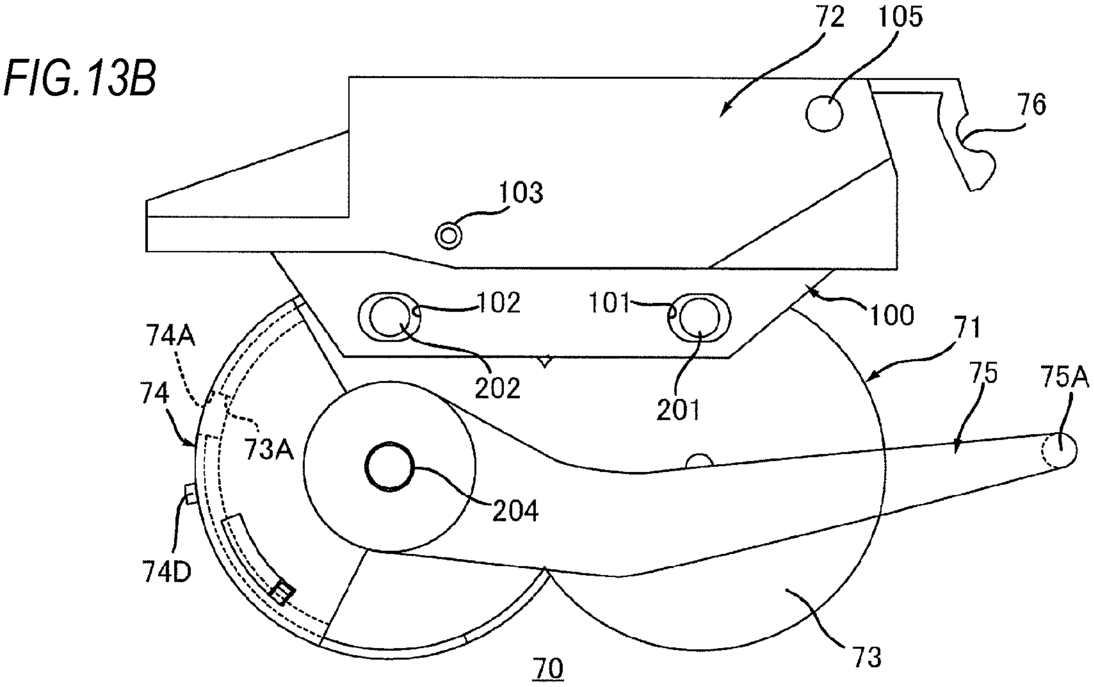
FIG. 13B is a side view of the toner cartridge shown in FIG. 12, depicting a state where the lever is located at the second position.

As shown in FIGS. 13A and 13B, the toner cartridge 70 includes a toner container 71 and a waste toner container 72.

7.2.1 Toner Container

The toner container 71 includes a housing 73, a shutter 74, and a lever 75. That is, the toner cartridge 70 includes the shutter 74 and the lever 75.

The housing 73 can accommodate therein the toner that is to be supplied to the developing roller 16. As shown in FIG. 12, the housing 73 has a toner discharge port 73A. In a state where the toner cartridge 70 is attached to the drum cartridge 80, the shutter 74 is located at the opening position and the first shutter 32 is located at the opening position, the toner can be discharged through the toner discharge port 73A. Also, the housing 73 is provided therein with two agitators 73B, 73C. The agitator 73B is located between the agitator 73C and the toner discharge port 73A. The agitator 73B and the agitator 73C are configured to stir the toner in the housing 73 and to convey the toner in the housing 73 toward the toner discharge port 73A.

The shutter 74 is configured to be movable relative to the housing 73 between the closing position (see FIG. 13A) and the opening position (see FIG. 13B). The shutter 74 has an opening 74A. When the shutter 74 is located at the opening position, the opening 74A communicates with the toner discharge port 73A. Thereby, the shutter 74 opens the toner discharge port 73A when located at the opening position. Also, when the shutter 74 is located at the closing position, the opening 74A is distant from the toner discharge port 73A in a moving direction of the shutter 74 and does not communicate with the toner discharge port 73A. In this case, the shutter 74 covers the toner discharge port 73A. Thereby, the shutter 74 closes the toner discharge port 73A when located at the closing position. In the meantime, the shutter 74 has a projection 74D. The projection 74D penetrates a part of the first shutter 32 of the drum cartridge 80 in the state where the toner cartridge 70 is attached to the drum cartridge 80. Thereby, in the state where the toner cartridge 70 is attached to the drum cartridge 80, the shutter 74 can be moved together with the first shutter 32.

As shown in FIGS. 13A and 13B, the lever 75 is configured to be movable between the first position (see FIG. 13A) and the second position (see FIG. 13B). Specifically, the lever 75 can be pivoted between the first position and the second position. The lever 75 is located on an outer surface of the housing 73 in the axis direction. The lever 75 is connected to an end portion of the shutter 74 in the axis direction. Thereby, the lever 75 moves the shutter 74 when being moved between the first position and the second position. The lever 75 locates the shutter 74 at the closing position when located at the first position. The lever 75 locates the shutter 74 at the opening position when located at the second position.

7.2.2 Waste Toner Container

The waste toner container 72 is movably coupled to the toner container 71.

Specifically, the waste toner container 72 is described with reference to FIG. 13B.

The waste toner container 72 has a coupling part 100. The coupling part 100 has a hole 101 and a hole 102. Also, the housing 73 of the toner container 71 has a projection 201 and a projection 202. The projection 201 is inserted into the hole 101 and the projection 202 is inserted into the hole 102, so that the waste toner container 72 is coupled to the toner container 71.

In a state where the projection 201 is inserted in the hole 101, the projection 201 is spaced from an the inner surface of the hole 101. Also, in a state where the projection 202 is inserted in the hole 102, the projection 202 is spaced from an the inner surface of the hole 102. There is an interval between the projection 201 and the hole 101 and there is also an interval between the projection 202 and the inner surface of the hole 102, so that the waste toner container 72 can be moved relative to the toner container 71 in the first direction and in the second direction.

In the third exemplary embodiment, the projection 201 and the projection 202 have a circular column shape, respectively. Also, the hole 101 and the hole 102 are a long hole that is long in the first direction, respectively. For this reason, a distance by which the waste toner container 72 is movable relative to the toner container 71 is longer in the first direction than in the second direction.

The toner container 71 is loosely coupled in a state where it can be moved relative to the waste toner container 72, so that the toner container 71 can be moved relative to the waste toner container 72 in the state where the toner cartridge 70 is attached to the drum cartridge 80. Specifically, in the state where the toner cartridge 70 is attached to the drum cartridge 80, it is possible to move the toner container 71 and the developing device 15 relative to the photosensitive drum 13 while keeping a state where the waste toner container 72 is not moved relative to the waste toner conveying pipe 81 and the frame 21. With the structure where the toner container 71 can be moved relative to the waste toner container 72 in the state where the waste toner container 72 is not moved relative to the waste toner conveying pipe 81 and the frame 21, it is possible to prevent the waste toner from being leaked from a coupled part of the waste toner container 72 and the waste toner conveying pipe 81 and to also bring the developing device 15 into contact with the photosensitive drum 13 at an optimal position for the developing.

The waste toner container 72 has an engagement part 76. A part of the lever 75 is engaged with the engagement part 76 when the lever 75 is located at the first position. Specifically, the engagement part 76 is a concave part in which a handle 75A of the lever 75 is fitted. As shown in FIG. 13A, when the lever 75 is located at the first position, a part of the lever 75 is engaged with the engagement part 76 of the waste toner container 72, so that the waste toner container 72 cannot be moved relative to the toner container 71. Also, as shown in FIG. 13B, when the lever 75 is located at the second position, the engagement between the part of the lever 75 and the engagement part 76 of the waste toner container 72 is released, so that the waste toner container 72 can be moved relative to the toner container 71.

7.3 Details of Drum Cartridge

As shown in FIG. 12, the drum cartridge 80 includes a waste toner conveying pipe 81 and an engagement part 82, in addition to the photosensitive drum 13, the charging roller 14, the drum cleaner 22, and the developing device 15.

7.3.1 Waste Toner Conveying Pipe

The waste toner conveying pipe 81 interconnects the drum cleaner 22 and the waste toner container 72 in the state where the toner cartridge 70 is attached to the drum cartridge 80. The waste toner conveying pipe 81 is configured to convey the waste toner from the drum cleaner 22 to the waste toner container 72 in the state where the toner cartridge 70 is attached to the drum cartridge 80. As shown in FIGS. 12 and 14, the waste toner conveying pipe 81 is configured to be movable between an attaching position (see FIG. 12) and a detaching position (see FIG. 14) while being connected to the waste toner container 72. When the waste toner conveying pipe 81 is located at the attaching position, the toner cartridge 70 is attached to the frame 21. When the waste toner conveying pipe 81 is located at the detaching position, the toner cartridge 70 is detached from the frame 21. The toner cartridge 70 can be attached to and detached from the waste toner conveying pipe 81 in the state where the waste toner conveying pipe 81 is located at the detaching position. In the state where the waste toner conveying pipe 81 is located at the detaching position, the toner cartridge 70 is detached from the waste toner conveying pipe 81 and is thus separated from the drum cartridge 80. Also, in the state where the waste toner conveying pipe 81 is located at the detaching position, the toner cartridge 70 is attached to the waste toner conveying pipe 81 and the waste toner conveying pipe 81 is then moved from the detaching position to the attaching position, so that the toner cartridge 70 is attached to the drum cartridge 80.

7.3.2 First Guide and Second Guide

Figure 14:
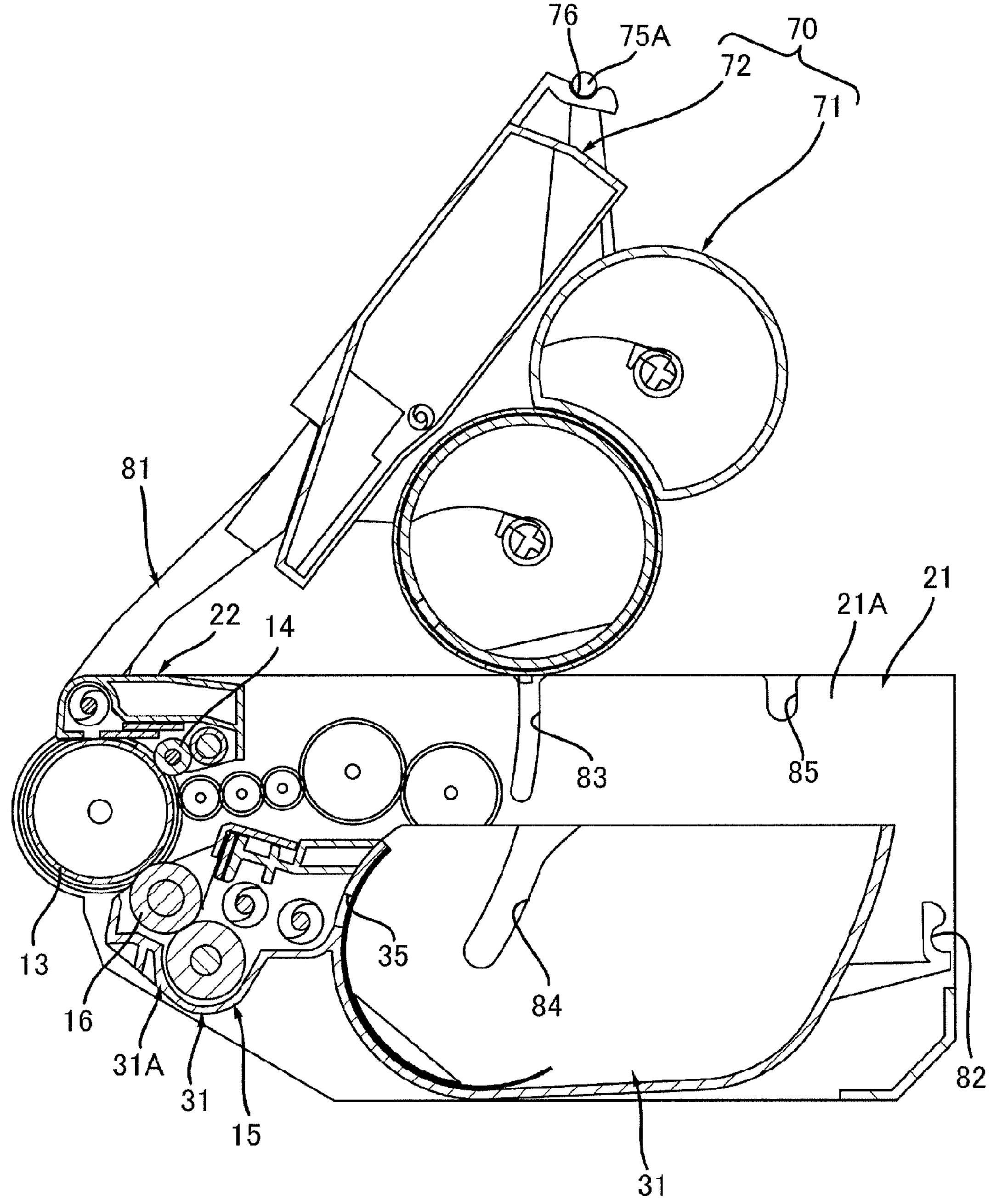
FIG. 14 illustrates attaching of the toner cartridge to the drum cartridge, depicting a state where the toner cartridge is connected to a waste toner conveying pipe and the waste toner conveying pipe is located at a demounting position.
Figure 15:
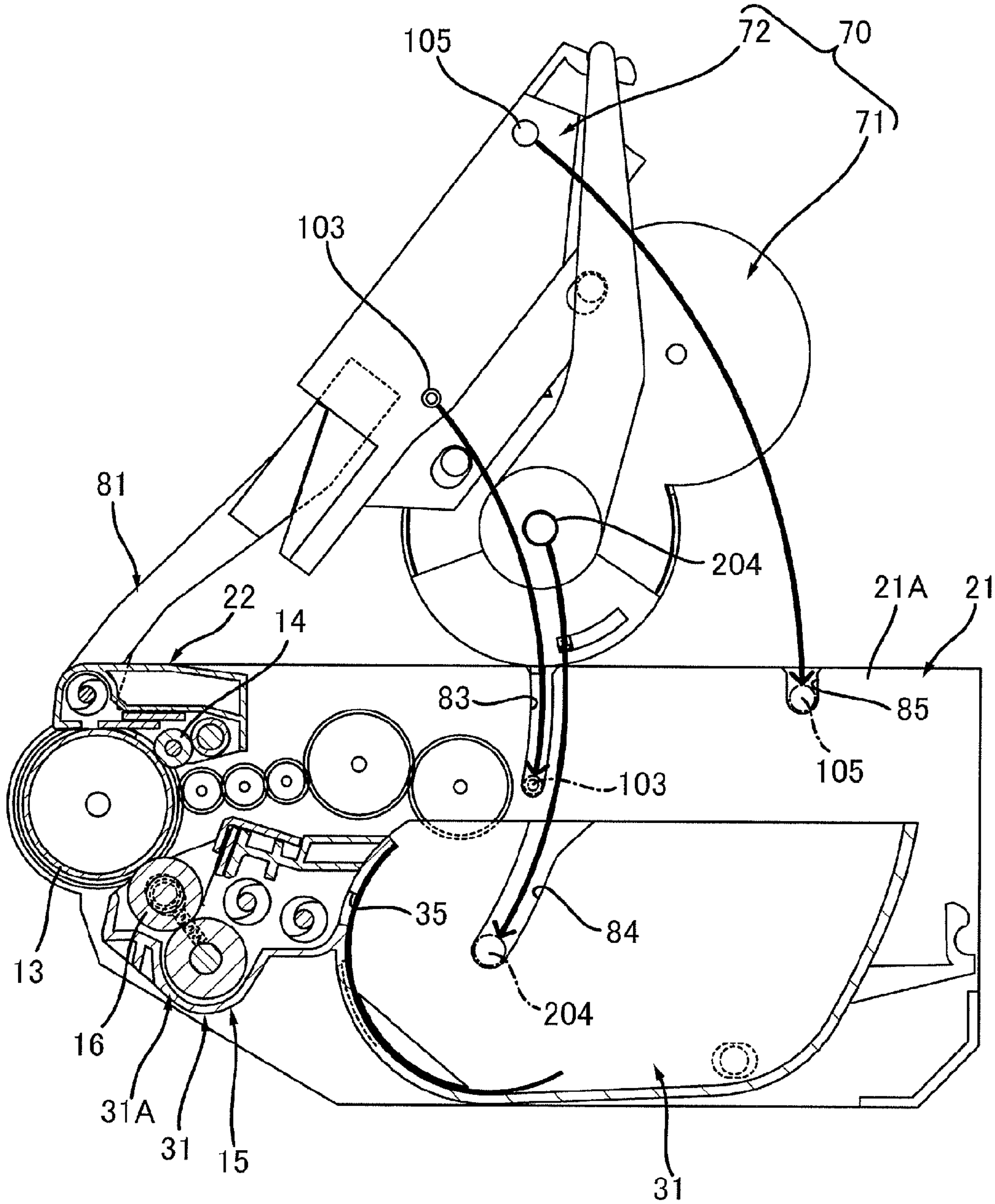
FIG. 15 illustrates attaching of the toner cartridge to the drum cartridge together with FIG. 14, depicting a state where a waste toner container is guided by a first guide and a third guide and the toner container is guided by a second guide.

As shown in FIGS. 14 and 15, the frame 21 has a first guide 83 and a third guide 85, and the developing device 15 has a second guide 84. When the toner cartridge 70 is being attached to the drum cartridge 80, the first guide 83 guides the projection 103 of the waste toner container 72. When the toner cartridge 70 is being attached to the drum cartridge 80, the third guide 85 guides the projection 105 of the waste toner container 72. Thereby, the waste toner container 72 is supported by the frame 21 in the state where the toner cartridge 70 is attached to the drum cartridge 80. When the toner cartridge 70 is being attached to the drum cartridge 80, the second guide 84 guides the projection 204 of the toner container 71. Thereby, the toner container 71 is supported by the developing device 15 in the state where the toner cartridge 70 is attached to the drum cartridge 80.

7.3.3 Engagement Part

The engagement part 82 is provided to the developing device 15. As shown in FIG. 12, when the toner cartridge 70 is attached to the drum cartridge 80 and the lever 75 is located at the second position, a part of the lever 75 is engaged with the engagement part 82. Specifically, the engagement part 82 is a concave part in which a handle 75A of the lever 75 is to be fitted. When the lever 75 is located at the second position, the engagement between the part of the lever 75 and the engagement part 76 of the waste toner container 72 is released, so that the toner container 71 can be moved relative to the waste toner container 72, and the part of the lever 75 and the engagement part 82 of the developing device 15 are engaged with each other, so that the toner container 71 can be moved relative to the photosensitive drum 13, together with the developing device 15.

7.4 Operational Effects of Third Exemplary Embodiment

Also in the third exemplary embodiment, it is possible to accomplish the same operational effects as the first exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A process cartridge comprising:

a drum cartridge including:

a photosensitive drum;

a cleaner configured to remove waste toner from the photosensitive drum;

a developing device including a developing roller and a toner receiving port;

a waste toner conveying pipe configured to convey the waste toner removed from the photosensitive drum by the cleaner, the waste toner conveying pipe having a waste toner discharge port through which the waste toner is to be discharged; and a frame supporting the photosensitive drum, the cleaner and the developing device; and a toner cartridge attachable to and detachable from the drum cartridge, the toner cartridge including:

a toner container capable of accommodating therein the toner to be supplied to the developing roller;

a waste toner container capable of accommodating therein the waste toner; and a housing having a cylindrical part, the cylindrical part including a toner discharge port and a waste toner receiving port, the toner discharge port configured to discharge the toner from the toner container to the developing device through the toner receiving port, and the waste toner receiving port configured to receive the waste toner from the waste toner conveying pipe through the waste toner discharge port.

2. The process cartridge according to claim 1, wherein the toner cartridge further includes a toner cartridge shutter onfigured to be movable between a closing position at which the toner cartridge shutter closes the waste toner receiving port and the toner discharge port and an opening position at which the toner cartridge shutter opens the waste toner receiving port and the toner discharge port.

3. The process cartridge according to claim 2, wherein the toner cartridge shutter configured to be movable along with a circumferential direction of the cylindrical part.

4. The process cartridge according to claim 3, wherein the waste toner receiving port and the toner discharge port are arranged along with a moving direction of the toner cartridge shutter.

5. The process cartridge according to claim 2, wherein the developing device includes a developing shutter configured to be movable between a closing position at which the developing shutter closes the toner receiving port and an opening position at which the developing shutter opens the toner receiving port, and wherein the developing shutter is movable together with the toner cartridge shutter in the state where the toner cartridge is attached to the drum cartridge.

6. The process cartridge according to claim 2, wherein the developing device includes a developing shutter configured to be movable between a closing position and an opening position, the developing shutter at the closing position closes the toner receiving port of the developing device and waste the toner discharge port of the waste toner conveying pipe, the developing shutter at the opening position opens the toner receiving port and waste the toner discharge port, and wherein the developing shutter is movable together with the toner cartridge shutter in the state where the toner cartridge is attached to the drum cartridge.

7. The process cartridge according to claim 1, wherein the waste toner receiving port is spaced from the toner discharge port in a circumferential direction of the cylindrical part.

8. The process cartridge according to claim 1, wherein the photosensitive drum is to be rotatable about a rotary axis, wherein the cylindrical part extends in the rotary axis direction, and wherein the waste toner receiving port and the toner discharge port are arranged at the same position in the rotary axis direction.

9. The process cartridge according to claim 1, further comprising:

a seal member located between the developing device and the waste toner conveying pipe, the seal member surrounding the waste toner discharge port and the toner receiving port of the developing device, wherein the seal member is capable of being deformed when the developing device is moved relative to the photosensitive drum, and wherein the developing device is supported by the frame to be movable and thereby the developing device is movable relative to the photosensitive drum.

10. The process cartridge according to claim 9, wherein the toner cartridge is attachable to and detachable from the developing device, and wherein the toner cartridge is movable relative to the photosensitive drum together with the developing device in a state where the toner cartridge is attached to the developing device.

11. The process cartridge according to claim 9, wherein the developing device is supported by the frame to be swingable relative to a swing shaft and thereby the developing device is movable relative to the photosensitive drum.

* * * * *